United States Patent
He et al.

(10) Patent No.: US 10,588,095 B2
(45) Date of Patent: Mar. 10, 2020

(54) POWER USAGE STATE INFORMATION TRANSMISSION METHOD AND APPARATUS

(71) Applicant: Huawei Technologies Co., Ltd., Shenzhen (CN)

(72) Inventors: Chuanfeng He, Beijing (CN); Bingyu Qu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 129 days.

(21) Appl. No.: 15/179,731

(22) Filed: Jun. 10, 2016

(65) Prior Publication Data
US 2016/0286504 A1 Sep. 29, 2016

Related U.S. Application Data

(63) Continuation of application No. PCT/CN2013/089105, filed on Dec. 11, 2013.

(51) Int. Cl.
*H04W 52/36* (2009.01)
*H04L 5/00* (2006.01)
(Continued)

(52) U.S. Cl.
CPC ........... *H04W 52/365* (2013.01); *H04L 5/001* (2013.01); *H04W 52/08* (2013.01); *H04W 52/10* (2013.01);
(Continued)

(58) Field of Classification Search
None
See application file for complete search history.

(56) References Cited

U.S. PATENT DOCUMENTS

| | | |
|---|---|---|
| 2005/0272459 A1 | 12/2005 | Lee et al. |
| 2011/0319112 A1 | 12/2011 | Jeong et al. |

(Continued)

FOREIGN PATENT DOCUMENTS

| | | |
|---|---|---|
| CN | 101340711 A | 1/2009 |
| CN | 102123437 A | 7/2011 |

(Continued)

OTHER PUBLICATIONS

"Pcmax, c reporting for extended power headroom reporting," 3GPP TSG-RAN WG2 Meeting #73bis, Shanghai, China, R2-112279, 3rd Generation Partnership Project, Valbonne, France (Apr. 11-15, 2011).

(Continued)

*Primary Examiner* — Adnan Baig

(74) *Attorney, Agent, or Firm* — Leydig, Voit & Mayer, Ltd.

(57) ABSTRACT

Embodiments of the present invention provide a power usage state information transmission method and apparatus. The transmission method for transmitting power usage state information according to the present invention includes: determining, by a terminal device, a power headroom PH of a second cell corresponding to the terminal device; and sending, by the terminal device to the first network device, the PH and channel configuration information corresponding to the PH. According to the embodiments of the present invention, the first network device can readily acquire, according to the PH and the channel configuration information, a power usage state of the second cell corresponding to the terminal device. In this way, transmit power of UE between different network devices can be properly allocated, and therefore, system resources are properly used.

20 Claims, 9 Drawing Sheets

(51) Int. Cl.
  *H04W 52/08* (2009.01)
  *H04W 52/10* (2009.01)
  *H04W 52/24* (2009.01)
  *H04W 72/12* (2009.01)
  *H04W 72/04* (2009.01)
  *H04W 52/32* (2009.01)
  *H04W 52/34* (2009.01)
  *H04W 52/14* (2009.01)

(52) U.S. Cl.
  CPC ....... *H04W 52/242* (2013.01); *H04W 52/367* (2013.01); *H04W 72/1284* (2013.01); *H04W 52/146* (2013.01); *H04W 52/325* (2013.01); *H04W 52/34* (2013.01); *H04W 72/0426* (2013.01)

(56) References Cited

U.S. PATENT DOCUMENTS

| | | |
|---|---|---|
| 2012/0044882 A1 | 2/2012 | Kim et al. |
| 2012/0087317 A1 | 4/2012 | Boström et al. |
| 2013/0336228 A1 | 12/2013 | Zhao et al. |
| 2015/0085760 A1* | 3/2015 | Yamada ............... H04W 24/10 370/329 |
| 2015/0215877 A1* | 7/2015 | Ahn .................... H04W 52/365 455/522 |
| 2015/0382313 A1 | 12/2015 | Kim et al. |

FOREIGN PATENT DOCUMENTS

| | | |
|---|---|---|
| CN | 103081528 A | 5/2013 |
| CN | 103190102 A | 7/2013 |
| CN | 103069870 A | 4/2014 |
| EP | 2400803 A2 | 12/2011 |
| EP | 2606668 A1 | 6/2013 |
| EP | 2636171 A2 | 9/2013 |
| KR | 20120001569 A | 1/2012 |
| RU | 2370894 C2 | 10/2009 |
| WO | WO 2012060659 A2 | 5/2012 |
| WO | 2012116643 A1 | 9/2012 |
| WO | 2013165228 A1 | 11/2013 |

OTHER PUBLICATIONS

"Power Headroom MAC CE format for CA," 3GPP TSG-RAN WG2 Meeting #72, Jacksonville, Florida, R2-106199, 3$^{rd}$ Generation Partnership Project, Valbonne, France (Nov. 15-19, 2010).

"3$^{rd}$ Generation Partnership Project; Technical Specification Group Radio Access Network; Evolved Universal Terrestrial Radio Access (E-UTRA); Physical layer procedures (Release 11)," 3GPP TS 36.213, V11.4.0, pp. 1-182, 3$^{rd}$ Generation Partnership Project, Valbonne, France (Sep. 2013).

"3$^{rd}$ Generation Partnership Project; Technical Specification Group Radio Access Network; Evolved Universal Terrestrial Radio Access (E-UTRA) Medium Access Control (MAC) protocol specification (Release 11)," 3GPP TS 36.321, V11.3.0, pp. 1-57, 3$^{rd}$ Generation Partnership Project, Valbonne, France (Jun. 2013).

"3$^{rd}$ Generation Partnership Project; Technical Specification Group Radio Access Network; Evolved Universal Terrestrial Radio Access (E-UTRA); Radio Resource Control (RRC); Protocol specification (Release 11)," 3GPP TS 36.331, V11.5.0, pp. 1-347, 3$^{rd}$ Generation Partnership Project, Valbonne, France (Sep. 2013).

"PHR for dual connectivity," 3GPP TSG-RAN WG2 Meeting #84, San Francisco, USA, R2-134089, 3rd Generation Partnership Project, Valbonne, France (Nov. 11-15, 2013).

"Uplink transmission power management and PHR reporting for dual connectivity", R2-133945 Panasonic, 3GPP TSG RAN WG2 Meeting #84,San Francisco, USA, Nov. 11-15, 2013, 3 pp.

* cited by examiner

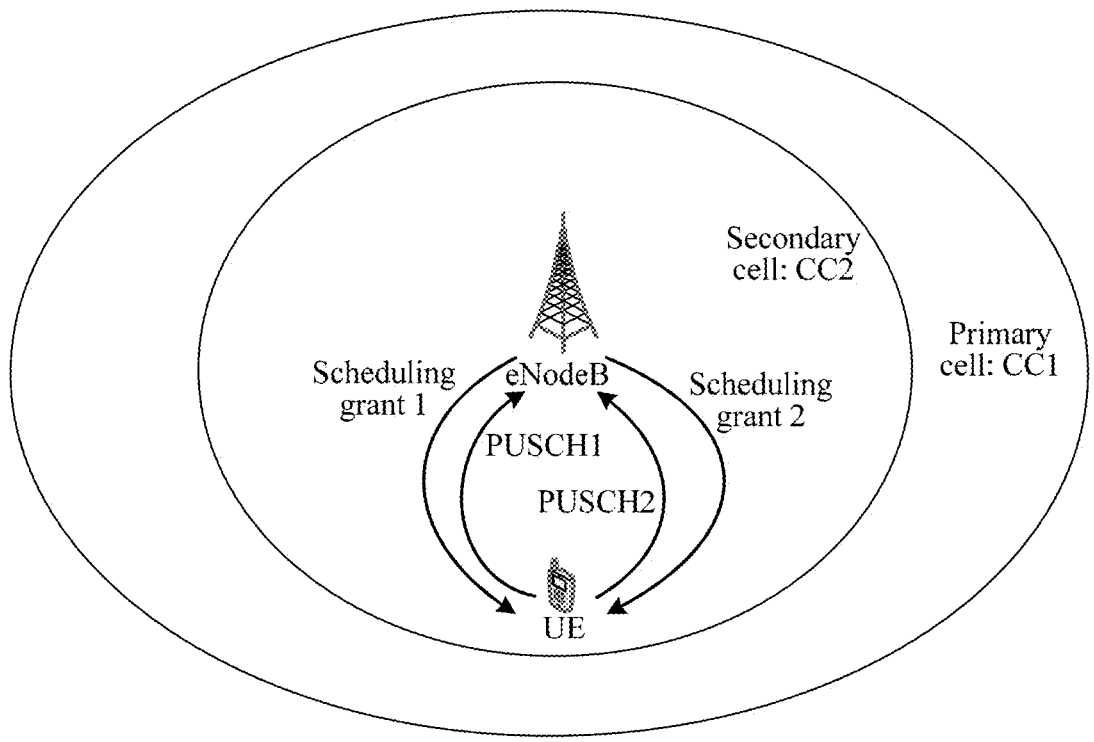

FIG. 1

```
A terminal device determines a power headroom PH of a second cell    ~ 201
        corresponding to the terminal device
```

```
The terminal device sends, to a first network device, the PH and channel    ~ 202
     configuration information corresponding to the PH
```

FIG. 2

```
When channel transmission exists in a subframe of a second cell,
wherein a power headroom PH corresponds to the subframe of the          ~ 301
second cell, a terminal device determines the power headroom PH of the
        second cell corresponding to the terminal device
```

```
The terminal device sends, to the first network device, the PH and    ~ 302
     maximum transmit power corresponding to the PH
```

FIG. 3

POWER USAGE STATE INFORMATION TRANSMISSION METHOD AND APPARATUS

CROSS-REFERENCE TO RELATED APPLICATION

This application is a continuation of International Application No. PCT/CN2013/089105, filed Dec. 11, 2013, which is incorporated herein by reference in its entirety.

TECHNICAL FIELD

Embodiments of the present invention relate to communications technologies, and in particular, to a power usage state information transmission method and apparatus.

BACKGROUND

A conventional communications system such as a $3^{rd}$ Generation Partnership Project Long Term Evolution (3GPP LTE) communications system includes some communications controllers such as a base station and an evolved NodeB (eNodeB), and communications devices such as user equipment (UE) and a mobile station. In the LTE system, a link on which sending is performed from the eNodeB to the UE is referred to as a downlink, and a link on which sending is performed from the UE to the eNodeB is referred to as an uplink. Data sent by the eNodeB to the UE is carried at a physical layer by using a physical downlink shared channel (PDSCH); data sent by the UE to the eNodeB is carried at a physical layer by using a physical uplink shared channel (PUSCH). The eNodeB indicates, to the UE by using a physical downlink control channel (PDCCH), a frequency domain resource and a transmission manner used by the PDSCH and/or PUSCH; the UE indicates a hybrid automatic repeat request-acknowledgement (HARQ-ACK) and a channel quality indicator (CQI) to the eNodeB by using a physical uplink control channel (PUCCH).

In a conventional Long Term Evolution-Advanced (LTE-A) communications system, a carrier aggregation (CA) technology can be supported, that is, two or more than two component carriers (CC) can be aggregated together and used for data transmission to support larger bandwidth, where bandwidth of each CC can reach 20 MHz. For example, in uplink CA, UE supports data transmission on two uplink CCs, and therefore, an eNodeB can perform scheduling on the UE to perform PUSCH transmission on the two uplink CCs, where the two uplink CCs include a primary component carrier (PCC) and a secondary component carrier (SCC), and correspondingly, cells respectively corresponding to two carriers are referred to as a primary cell (Pcell) and a secondary cell (Scell).

FIG. 1 is a schematic diagram of a conventional CA technology. As shown in FIG. 1, uplink CA is used as an example, and it is assumed that two cells under control of an eNodeB respectively use a CC1 (which may be correspondingly referred to as a PCC) and a CC2 (which may be correspondingly referred to as an SCC), where the cell using the CC1 is a Pcell, and the cell using the CC2 is an Scell. Further, the Pcell may schedule, by using a scheduling grant 1, UE to send PUSCH1 on an uplink of the Pcell and the Scell may schedule, by using a scheduling grant 2, the UE to send PUSCH2 on an uplink of the Scell.

CA defined in a conventional 3GPP LTE R11 standard is established on the assumption of ideal backhaul, that is, backhaul between different network devices of CCs or between different units of a same network device of CCs is controlled to have a quite low time delay, and information exchange can be rapidly performed, and therefore, scheduling of the CCs on UE can be dynamically coordinated. For example, for CA in a same eNodeB shown in FIG. 1, that is, multiple cells under control of an eNodeB use different CCs; when the cells may jointly serve a user by means of carrier aggregation, backhaul between the cells is ideal and information exchange can be rapidly performed because these multiple cells belong to the same eNodeB.

In a conventional communications system, when user equipment (UE) has a multi-carrier transmission capability, multiple carriers may be configured for the UE to serve the UE, that is, carrier aggregation (CA). In a CA technology, UE may configure maximum transmit power for each carrier, and may report a power headroom (PH) of a cell corresponding to each carrier to an eNodeB, so that the eNodeB can obtain information about residual power of the UE according to the PH, thereby determining radio resource power scheduled for the UE. However, a value of total transmit power of the UE on multiple carriers still needs to satisfy maximum transmit power determined by requirements in an aspect of human health, network configurations, and the like.

The conventional CA technology is based on the assumption of ideal backhaul, that is, information exchange between different cells has a quite low time delay and a quite large capacity. A cell can acquire dynamic information of another cell in time, and therefore, a radio resource is scheduled for UE according to the dynamic information. The cell may be controlled by a same eNodeB or different eNodeBs.

However, in actual application, due to factors such as an environment and costs of deploying a communications device such as an eNodeB, implementation of ideal backhaul is quite difficult. In non-ideal backhaul, a time delay of information exchange between eNodeBs or between different units of an eNodeB is relatively large. For example, a cell controlled by different eNodeBs can only acquire a PH, reported by UE, of another cell; therefore, a case in which total transmit power needed by the UE on carriers exceeds allowed maximum transmit power. As a result, the UE performs power compression, a transmission error probability increases, and a loss of an uplink throughput of the UE occurs; in addition, a case of resource waste may occur because transmit power of the UE on each carrier is quite small.

SUMMARY

Embodiments of the present invention provide a power usage state information transmission method and apparatus, so that system resources are properly used.

According to a first aspect, an embodiment of the present invention provides a power usage state information transmission method, including:

determining, by a terminal device, a power headroom PH of a second cell corresponding to the terminal device; and sending, by the terminal device to a first network device, the PH and channel configuration information corresponding to the PH, where the first network device is a network device that controls a first cell.

With reference to the first aspect, in a first possible implementation manner of the first aspect, the channel includes at least one of the following channels:

a physical uplink shared channel PUSCH and a physical uplink control channel PUCCH.

With reference to the first aspect or the first possible implementation manner of the first aspect, in a second possible implementation manner of the first aspect, the channel configuration information includes at least one piece of the following information:

a quantity of resource blocks RBs, a scheduling grant manner, transmission format information, and channel sending state information.

With reference to the second possible implementation manner of the first aspect, in a third possible implementation manner of the first aspect, the scheduling grant manner includes at least one of the following manners:

a semi-persistent scheduling grant, a dynamic scheduling grant, and a random access response grant.

With reference to the second possible implementation manner of the first aspect, in a fourth possible implementation manner of the first aspect, the transmission format information includes at least one piece of the following information:

bits information of a PUSCH, whether a PUSCH carries only control information, a transmission format of a PUCCH, and bits information of PUCCH transmission.

With reference to the first aspect or any one of the first to fourth possible implementation manners of the first aspect, in a fifth possible implementation manner of the first aspect, before the determining, by a terminal device, a PH of a second cell corresponding to the terminal device, the method further includes:

receiving, by the terminal device, notification signaling sent by the first network device, where the notification signaling is used for instructing the terminal device to send, to the first network device, the PH of the second cell corresponding to the terminal device and the channel configuration information corresponding to the PH.

According to a second aspect, an embodiment of the present invention provides a power usage state information transmission method, including:

when channel transmission exists in a subframe of a second cell, wherein a power headroom PH corresponds to the subframe of the second cell, determining, by a terminal device, the PH of the second cell corresponding to the terminal device; and sending, by the terminal device to a first network device, the PH and maximum transmit power corresponding to the PH, where the first network device is a network device that controls a first cell; the PH is obtained through calculation by the terminal device based on pre-defined channel configuration information or based on channel configuration information configured by a signaling; and the maximum transmit power corresponding to the PH is maximum transmit power configured by the terminal device for the second cell in the subframe of the second cell corresponding to the PH.

With reference to the second aspect, in a first possible implementation manner of the second aspect, the channel includes at least one of the following channels:

a physical uplink shared channel PUSCH and a physical uplink control channel PUCCH.

With reference to the second aspect or the first possible implementation manner of the second aspect, in a second possible implementation manner of the second aspect, the channel configuration information includes at least one piece of the following information:

a quantity of resource blocks RBs, a scheduling grant manner, transmission format information, and channel sending state information.

With reference to the second possible implementation manner of the second aspect, in a third possible implementation manner of the second aspect, the scheduling grant manner includes at least one of the following manners:

a semi-persistent scheduling grant, a dynamic scheduling grant, and a random access response grant.

With reference to the second possible implementation manner of the second aspect, in a fourth possible implementation manner of the second aspect, the transmission format information includes at least one piece of the following information:

bits information of a PUSCH, whether a PUSCH carries only control information, a transmission format of a PUCCH, and bits information of PUCCH transmission.

With reference to the second aspect or any one of the first to fourth possible implementation manners of the second aspect, in a fifth possible implementation manner of the second aspect, before the determining, by a terminal device, the PH of the second cell corresponding to the terminal device, the method further includes:

receiving, by the terminal device, notification signaling sent by the first network device, where the notification signaling is used for instructing the terminal device to send, to the first network device, the PH of the second cell corresponding to the terminal device and the maximum transmit power corresponding to the PH.

With reference to the second aspect or any one of the first to fifth possible implementation manners of the second aspect, in a sixth possible implementation manner of the second aspect, before the sending, by the terminal device to a first network device, the PH and maximum transmit power corresponding to the PH, the method further includes:

receiving, by the terminal device, the signaling, where the signaling includes the channel configuration information.

According to a third aspect, an embodiment of the present invention provides a power usage state information transmission method, including:

receiving, by a first network device, a power headroom PH of a second cell corresponding to a terminal device and channel configuration information corresponding to the PH that are sent by the terminal device, where the first network device is a network device that controls a first cell; and acquiring, by the first network device according to the PH and the channel configuration information, a power usage state of the second cell corresponding to the terminal device.

With reference to the third aspect, in a first possible implementation manner of the third aspect, the channel includes at least one of the following channels:

a physical uplink shared channel PUSCH and a physical uplink control channel PUCCH.

With reference to the third aspect or the first possible implementation manner of the third aspect, in a second possible implementation manner of the third aspect, the channel configuration information includes at least one piece of the following information:

a quantity of resource blocks RBs, a scheduling grant manner, transmission format information, and channel sending state information.

With reference to the second possible implementation manner of the third aspect, in a third possible implementation manner of the third aspect, the scheduling grant manner includes at least one of the following manners:

a semi-persistent scheduling grant, a dynamic scheduling grant, and a random access response grant.

With reference to the second possible implementation manner of the third aspect, in a fourth possible implementation manner of the third aspect, the transmission format information includes at least one piece of the following information:

bits information of a PUSCH, whether a PUSCH carries only control information, a transmission format of a PUCCH, and bits information of PUCCH transmission.

With reference to the third aspect or any one of the first to fourth possible implementation manners of the third aspect, in a fifth possible implementation manner of the third aspect, after the acquiring, by the first network device according to the PH and the channel configuration information, a power usage state of the second cell corresponding to the terminal device, the method further includes:

performing, by the first network device, coordinated scheduling on the terminal device according to the power usage state.

With reference to the fifth possible implementation manner of the third aspect, in a sixth possible implementation manner of the third aspect, the performing, by the first network device, coordinated scheduling on the terminal device according to the power usage state includes:

controlling, by the first network device, scheduling of a second network device for the terminal device according to the power usage state, where the second network device is a network device that controls the second cell; and/or controlling, by the first network device, scheduling of the first network device for the terminal device according to the power usage state.

With reference to the sixth possible implementation manner of the third aspect, in a seventh possible implementation manner of the third aspect, the controlling, by the first network device, scheduling of a second network device for the terminal device according to the power usage state includes:

calculating, by the first network device according to the power usage state, a scheduling limitation under which the second network device can perform scheduling on the terminal device; and sending, by the first network device, control signaling to the second network device, where the control signaling includes the scheduling limitation.

With reference to the seventh possible implementation manner of the third aspect, in an eighth possible implementation manner of the third aspect, after the sending, by the first network device, control signaling to the second network device, the method further includes:

determining, by the first network device, scheduling of the first network device for the terminal device according to the power usage state and the scheduling limitation.

With reference to the third aspect or any one of the first to eighth possible implementation manners of the third aspect, in a ninth possible implementation manner of the third aspect, before the receiving, by a first network device, a power headroom PH of a second cell corresponding to a terminal device and channel configuration information corresponding to the PH that are sent by the terminal device, the method further includes:

sending, by the first network device, notification signaling to the terminal device, so that the terminal device sends the PH and the channel configuration information to the first network device.

According to a fourth aspect, an embodiment of the present invention provides a power usage state information transmission method, including:

when channel transmission exists in a subframe of a second cell, wherein a power headroom PH corresponds to the subframe of the second cell, receiving, by a first network device, the PH of the second cell corresponding to a terminal device and maximum transmit power corresponding to the PH that are sent by the terminal device, where the first network device is a network device that controls a first cell; and acquiring, by the first network device according to the PH and the maximum transmit power, a power usage state of the second cell corresponding to the terminal device, where the PH is obtained through calculation by the terminal device based on pre-defined channel configuration information or based on channel configuration information configured by a signaling; and the maximum transmit power corresponding to the PH is maximum transmit power configured by the terminal device for the second cell in the subframe of the second cell corresponding to the PH.

With reference to the fourth aspect, in a first possible implementation manner of the fourth aspect, the channel includes at least one of the following channels:

a physical uplink shared channel PUSCH and a physical uplink control channel PUCCH.

With reference to the fourth aspect or the first possible implementation manner of the fourth aspect, in a second possible implementation manner of the fourth aspect, the channel configuration information includes at least one piece of the following information:

a quantity of resource blocks RBs, a scheduling grant manner, transmission format information, and channel sending state information.

With reference to the second possible implementation manner of the fourth aspect, in a third possible implementation manner of the fourth aspect, the scheduling grant manner includes at least one of the following manners:

a semi-persistent scheduling grant, a dynamic scheduling grant, and a random access response grant.

With reference to the second possible implementation manner of the fourth aspect, in a fourth possible implementation manner of the fourth aspect, the transmission format information includes at least one piece of the following information:

bits information of a PUSCH, whether a PUSCH carries only control information, a transmission format of a PUCCH, and bits information of PUCCH transmission.

With reference to the fourth aspect or any one of the first to fourth possible implementation manners of the fourth aspect, in a fifth possible implementation manner of the fourth aspect, after the acquiring, by the first network device according to the PH and the maximum transmit power, a power usage state of the second cell corresponding to the terminal device, the method further includes:

performing, by the first network device, coordinated scheduling on the terminal device according to the power usage state.

With reference to the fifth possible implementation manner of the fourth aspect, in a sixth possible implementation manner of the fourth aspect, the performing, by the first network device, coordinated scheduling on the terminal device according to the power usage state includes:

controlling, by the first network device, scheduling of a second network device for the terminal device according to the power usage state, where the second network device is a network device that controls the second cell; and/or controlling, by the first network device, scheduling of the first network device for the terminal device according to the power usage state.

With reference to the sixth possible implementation manner of the fourth aspect, in a seventh possible implementation manner of the fourth aspect, the controlling, by the first network device, scheduling of a second network device for the terminal device according to the power usage state includes:

calculating, by the first network device according to the power usage state, a scheduling limitation under which the second network device can perform scheduling on the terminal device; and sending, by the first network device, control signaling to the second network device, where the control signaling includes the scheduling limitation.

With reference to the seventh possible implementation manner of the fourth aspect, in an eighth possible implementation manner of the fourth aspect, after the sending, by the first network device, control signaling to the second network device, the method further includes:

determining, by the first network device, scheduling of the first network device for the terminal device according to the power usage state and the scheduling limitation.

With reference to the fourth aspect or any one of the first to eighth possible implementation manners of the fourth aspect, in a ninth possible implementation manner of the fourth aspect, before the receiving, by a first network device, the power headroom PH of the second cell corresponding to a terminal device and maximum transmit power corresponding to the PH that are sent by the terminal device, the method further includes:

sending, by the first network device, notification signaling to the terminal device, so that the terminal device sends, to the first network device, the PH and the maximum transmit power corresponding to the PH.

With reference to the fourth aspect or any one of the first to ninth possible implementation manners of the fourth aspect, in a tenth possible implementation manner of the fourth aspect, before the receiving, by a first network device, the power headroom PH of the second cell corresponding to a terminal device and maximum transmit power corresponding to the PH that are sent by the terminal device, the method further includes:

sending, by the first network device, the signaling to the terminal device, where the signaling includes the channel configuration information.

According to a fifth aspect, an embodiment of the present invention provides a power usage state information transmission method, including:

receiving, by a first network device, signaling sent by a second network device, where the first network device is a network device that controls a first cell; the second network device is a network device that controls a second cell; and the signaling includes a power headroom PH of the second cell corresponding to a terminal device and channel configuration information corresponding to the PH; and acquiring, by the first network device according to the PH and the channel configuration information, a power usage state of the second cell corresponding to the terminal device.

With reference to the fifth aspect, in a first possible implementation manner of the fifth aspect, the channel includes at least one of the following channels:

a physical uplink shared channel PUSCH and a physical uplink control channel PUCCH.

With reference to the fifth aspect or the first possible implementation manner of the fifth aspect, in a second possible implementation manner of the fifth aspect, the channel configuration information includes at least one piece of the following information:

a quantity of resource blocks RBs, a scheduling grant manner, transmission format information, and channel sending state information.

With reference to the second possible implementation manner of the fifth aspect, in a third possible implementation manner of the fifth aspect, the scheduling grant manner includes at least one of the following manners:

a semi-persistent scheduling grant, a dynamic scheduling grant, and a random access response grant.

With reference to the second possible implementation manner of the fifth aspect, in a fourth possible implementation manner of the fifth aspect, the transmission format information includes at least one piece of the following information:

bits information of a PUSCH, whether a PUSCH carries only control information, a transmission format of a PUCCH, and bits information of PUCCH transmission.

With reference to the fifth aspect or any one of the first to fourth possible implementation manners of the fifth aspect, in a fifth possible implementation manner of the fifth aspect, after the acquiring, by the first network device according to the PH and the channel configuration information, a power usage state of the second cell corresponding to the terminal device, the method further includes:

performing, by the first network device, coordinated scheduling on the terminal device according to the power usage state.

With reference to the fifth possible implementation manner of the fifth aspect, in a sixth possible implementation manner of the fifth aspect, the performing, by the first network device, coordinated scheduling on the terminal device according to the power usage state includes:

controlling, by the first network device, scheduling of the second network device for the terminal device according to the power usage state, where the second network device is a network device that controls the second cell; and/or controlling, by the first network device, scheduling of the first network device for the terminal device according to the power usage state.

With reference to the sixth possible implementation manner of the fifth aspect, in a seventh possible implementation manner of the fifth aspect, the controlling, by the first network device, scheduling of the second network device for the terminal device according to the power usage state includes:

calculating, by the first network device according to the power usage state, a scheduling limitation under which the second network device can perform scheduling on the terminal device; and sending, by the first network device, control signaling to the second network device, where the control signaling includes the scheduling limitation.

With reference to the seventh possible implementation manner of the fifth aspect, in an eighth possible implementation manner of the fifth aspect, after the sending, by the first network device, control signaling to the second network device, the method further includes:

determining, by the first network device, scheduling of the first network device for the terminal device according to the power usage state and the scheduling limitation.

With reference to the fifth aspect or any one of the first to eighth possible implementation manners of the fifth aspect, in a ninth possible implementation manner of the fifth aspect, before the receiving, by a first network device, signaling sent by a second network device, the method further includes:

sending, by the first network device, notification signaling to the second network device, so that the second network device sends, to the first network device, the signaling that includes the power headroom PH of the second cell corresponding to the terminal device and the channel configuration information corresponding to the PH.

According to a sixth aspect, an embodiment of the present invention provides a power usage state information transmission method, including:

when channel transmission exists in a subframe of a second cell, wherein a power headroom PH corresponds to the subframe of the second cell, receiving, by a first network device, signaling sent by a second network device, where the first network device is a network device that controls a first cell; the second network device is a network device that controls a second cell; and the signaling includes the PH of the second cell corresponding to a terminal device and maximum transmit power corresponding to the PH; and acquiring, by the first network device according to the PH and the maximum transmit power, a power usage state of the second cell corresponding to the terminal device, where the PH is obtained through calculation by the terminal device based on pre-defined channel configuration information or based on channel configuration information configured by a signaling; and the maximum transmit power corresponding to the PH is maximum transmit power configured by the terminal device for the second cell in the subframe of the second cell corresponding to the PH.

With reference to the sixth aspect, in a first possible implementation manner of the sixth aspect, the channel includes at least one of the following channels:

a physical uplink shared channel PUSCH and a physical uplink control channel PUCCH.

With reference to the sixth aspect or the first possible implementation manner of the sixth aspect, in a second possible implementation manner of the sixth aspect, the channel configuration information includes at least one piece of the following information:

a quantity of resource blocks RBs, a scheduling grant manner, transmission format information, and channel sending state information.

With reference to the second possible implementation manner of the sixth aspect, in a third possible implementation manner of the sixth aspect, the scheduling grant manner includes at least one of the following manners:

a semi-persistent scheduling grant, a dynamic scheduling grant, and a random access response grant.

With reference to the second possible implementation manner of the sixth aspect, in a fourth possible implementation manner of the sixth aspect, the transmission format information includes at least one piece of the following information:

bits information of a PUSCH, whether a PUSCH carries only control information, a transmission format of a PUCCH, and bits information of PUCCH transmission.

With reference to the sixth aspect or any one of the first to fourth possible implementation manners of the sixth aspect, in a fifth possible implementation manner of the sixth aspect, after the acquiring, by the first network device according to the PH and the maximum transmit power, a power usage state of the second cell corresponding to the terminal device, the method further includes:

performing, by the first network device, coordinated scheduling on the terminal device according to the power usage state.

With reference to the fifth possible implementation manner of the sixth aspect, in a sixth possible implementation manner of the sixth aspect, the performing, by the first network device, coordinated scheduling on the terminal device according to the power usage state includes:

controlling, by the first network device, scheduling of the second network device for the terminal device according to the power usage state, where the second network device is a network device that controls the second cell; and/or controlling, by the first network device, scheduling of the first network device for the terminal device according to the power usage state.

With reference to the sixth possible implementation manner of the sixth aspect, in a seventh possible implementation manner of the sixth aspect, the controlling, by the first network device, scheduling of the second network device for the terminal device according to the power usage state includes:

calculating, by the first network device according to the power usage state, a scheduling limitation under which the second network device can perform scheduling on the terminal device; and sending, by the first network device, control signaling to the second network device, where the control signaling includes the scheduling limitation.

With reference to the seventh possible implementation manner of the sixth aspect, in an eighth possible implementation manner of the sixth aspect, after the sending, by the first network device, control signaling to the second network device, the method further includes:

determining, by the first network device, scheduling of the first network device for the terminal device according to the power usage state and the scheduling limitation.

With reference to the sixth aspect or any one of the first to eighth possible implementation manners of the sixth aspect, in a ninth possible implementation manner of the sixth aspect, before the receiving, by a first network device, signaling sent by a second network device, the method further includes:

sending, by the first network device to the first network device, notification signaling to the second network device, so that the second network device sends the signaling that includes the PH and the maximum transmit power corresponding to the PH.

According to a seventh aspect, an embodiment of the present invention provides a terminal device, including:

a determining module, configured to determine a power headroom PH of a second cell corresponding to the terminal device; and a sending module, configured to send, to the first network device, the PH and channel configuration information corresponding to the PH, where the first network device is a network device that controls a first cell.

With reference to the seventh aspect, in a first possible implementation manner of the seventh aspect, the channel includes at least one of the following channels:

a physical uplink shared channel PUSCH and a physical uplink control channel PUCCH.

With reference to the seventh aspect or the first possible implementation manner of the seventh aspect, in a second possible implementation manner of the seventh aspect, the channel configuration information includes at least one piece of the following information:

a quantity of resource blocks RBs, a scheduling grant manner, transmission format information, and channel sending state information.

With reference to the second possible implementation manner of the seventh aspect, in a third possible implementation manner of the seventh aspect, the scheduling grant manner includes at least one of the following manners:

a semi-persistent scheduling grant, a dynamic scheduling grant, and a random access response grant.

With reference to the second possible implementation manner of the seventh aspect, in a fourth possible implementation manner of the seventh aspect, the transmission format information includes at least one piece of the following information:

bits information of a PUSCH, whether a PUSCH carries only control information, a transmission format of a PUCCH, and bits information of PUCCH transmission.

With reference to the seventh aspect or any one of the first to fourth possible implementation manners of the seventh aspect, in a fifth possible implementation manner of the seventh aspect, the device further includes:

a receiving module, configured to receive notification signaling sent by the first network device, where the notification signaling is used for instructing the terminal device to send, to the first network device, the PH of the second cell corresponding to the terminal device and channel parameter configuration information corresponding to the PH.

According to an eighth aspect, an embodiment of the present invention provides a terminal device, including:

a determining module, configured to: when channel transmission exists in a subframe of a second cell, wherein a power headroom PH corresponds to the subframe of the second cell, determine the PH of the second cell corresponding to the terminal device; and a sending module, configured to send, to the first network device, the PH and maximum transmit power corresponding to the PH, where the first network device is a network device that controls a first cell; the PH is obtained through calculation by the terminal device based on pre-defined channel configuration information or based on channel configuration information configured by a signaling; and the maximum transmit power corresponding to the PH is maximum transmit power configured by the terminal device for the second cell in the subframe of the second cell corresponding to the PH.

With reference to the eighth aspect, in a first possible implementation manner of the eighth aspect, the channel includes at least one of the following channels:

a physical uplink shared channel PUSCH and a physical uplink control channel PUCCH.

With reference to the eighth aspect or the first possible implementation manner of the eighth aspect, in a second possible implementation manner of the eighth aspect, the channel configuration information includes at least one piece of the following information:

a quantity of resource blocks RBs, a scheduling grant manner, transmission format information, and channel sending state information.

With reference to the second possible implementation manner of the eighth aspect, in a third possible implementation manner of the eighth aspect, the scheduling grant manner includes at least one of the following manners:

a semi-persistent scheduling grant, a dynamic scheduling grant, and a random access response grant.

With reference to the second possible implementation manner of the eighth aspect, in a fourth possible implementation manner of the eighth aspect, the transmission format information includes at least one piece of the following information:

bits information of a PUSCH, whether a PUSCH carries only control information, a transmission format of a PUCCH, and bits information of PUCCH transmission.

With reference to the eighth aspect or any one of the first to fourth possible implementation manners of the eighth aspect, in a fifth possible implementation manner of the eighth aspect, the device further includes:

a receiving module, configured to receive notification signaling sent by the first network device, where the notification signaling is used for instructing the terminal device to send, to the first network device, the PH of the second cell corresponding to the terminal device and the maximum transmit power corresponding to the PH.

With reference to the eighth aspect or any one of the first to fifth possible implementation manners of the eighth aspect, in a sixth possible implementation manner of the eighth aspect, the receiving module is further configured to receive the signaling, where the signaling includes the channel configuration information.

According to a ninth aspect, an embodiment of the present invention provides a network device, including:

a receiving module, configured to receive a power headroom PH of a second cell corresponding to a terminal device and channel configuration information corresponding to the PH that are sent by the terminal device; and an acquiring module, configured to acquire, according to the PH and the channel configuration information, a power usage state of the second cell corresponding to the terminal device.

With reference to the ninth aspect, in a first possible implementation manner of the ninth aspect, the channel includes at least one of the following channels:

a physical uplink shared channel PUSCH and a physical uplink control channel PUCCH.

With reference to the ninth aspect or the first possible implementation manner of the ninth aspect, in a second possible implementation manner of the ninth aspect, the channel configuration information includes at least one piece of the following information:

a quantity of resource blocks RBs, a scheduling grant manner, transmission format information, and channel sending state information.

With reference to the second possible implementation manner of the ninth aspect, in a third possible implementation manner of the ninth aspect, the scheduling grant manner includes at least one of the following manners:

a semi-persistent scheduling grant, a dynamic scheduling grant, and a random access response grant.

With reference to the second possible implementation manner of the ninth aspect, in a fourth possible implementation manner of the ninth aspect, the transmission format information includes at least one piece of the following information:

bits information of a PUSCH, whether a PUSCH carries only control information, a transmission format of a PUCCH, and bits information of PUCCH transmission.

With reference to the ninth aspect or any one of the first to fourth possible implementation manners of the ninth aspect, in a fifth possible implementation manner of the ninth aspect, the device further includes:

a coordination module, configured to perform coordinated scheduling on the terminal device according to the power usage state.

With reference to the fifth possible implementation manner of the ninth aspect, in a sixth possible implementation manner of the ninth aspect, the coordination module includes:

a first control unit, configured to control scheduling of the second network device for the terminal device according to the power usage state, where the second network device is a network device that controls the second cell; and/or a second control unit, configured to control scheduling of the first network device for the terminal device according to the power usage state.

With reference to the sixth possible implementation manner of the ninth aspect, in a seventh possible implementation manner of the ninth aspect, the first control unit is specifically configured to:

calculate, according to the power usage state, a scheduling limitation under which the second network device can perform scheduling on the terminal device; and send control signaling to the second network device, where the control signaling includes the scheduling limitation.

With reference to the seventh possible implementation manner of the ninth aspect, in an eighth possible implementation manner of the ninth aspect, the first control unit is further specifically configured to determine scheduling of the first network device for the terminal device according to the power usage state and the scheduling limitation.

With reference to the ninth aspect or any one of the first to eighth possible implementation manners of the ninth aspect, in a ninth possible implementation manner of the ninth aspect, the device further includes:

a sending module, configured to send notification signaling to the terminal device, so that the terminal device sends the PH and the channel configuration information to the first network device.

According to a tenth aspect, an embodiment of the present invention provides a network device, including:

a receiving module, configured to: when channel transmission exists in a subframe of a second cell, wherein a power headroom PH corresponds to the subframe of the second cell, receive the PH of the second cell corresponding to a terminal device and maximum transmit power corresponding to the PH that are sent by the terminal device; and an acquiring module, configured to acquire, according to the PH and the maximum transmit power, a power usage state of the second cell corresponding to the terminal device, where the PH is obtained through calculation by the terminal device based on pre-defined channel configuration information or based on channel configuration information configured by a signaling; and the maximum transmit power corresponding to the PH is maximum transmit power configured by the terminal device for the second cell in the subframe of the second cell corresponding to the PH.

With reference to the tenth aspect, in a first possible implementation manner of the tenth aspect, the channel includes at least one of the following channels:

a physical uplink shared channel PUSCH and a physical uplink control channel PUCCH.

With reference to the tenth aspect or the first possible implementation manner of the tenth aspect, in a second possible implementation manner of the tenth aspect, the channel configuration information includes at least one piece of the following information:

a quantity of resource blocks RBs, a scheduling grant manner, transmission format information, and channel sending state information.

With reference to the second possible implementation manner of the tenth aspect, in a third possible implementation manner of the tenth aspect, the scheduling grant manner includes at least one of the following manners:

a semi-persistent scheduling grant, a dynamic scheduling grant, and a random access response grant.

With reference to the second possible implementation manner of the tenth aspect, in a fourth possible implementation manner of the tenth aspect, the transmission format information includes at least one piece of the following information:

bits information of a PUSCH, whether a PUSCH carries only control information, a transmission format of a PUCCH, and bits information of PUCCH transmission.

With reference to the tenth aspect or any one of the first to fourth possible implementation manners of the tenth aspect, in a fifth possible implementation manner of the tenth aspect, the device further includes:

a coordination module, configured to perform coordinated scheduling on the terminal device according to the power usage state.

With reference to the fifth possible implementation manner of the tenth aspect, in a sixth possible implementation manner of the tenth aspect, the coordination module includes:

a first control unit, configured to control scheduling of a second network device for the terminal device according to the power usage state, where the second network device is a network device that controls the second cell; and/or a second control unit, configured to control scheduling of the first network device for the terminal device according to the power usage state.

With reference to the sixth possible implementation manner of the tenth aspect, in a seventh possible implementation manner of the tenth aspect, the first control unit is specifically configured to:

calculate, according to the power usage state, a scheduling limitation under which the second network device can perform scheduling on the terminal device; and send control signaling to the second network device, where the control signaling includes the scheduling limitation.

With reference to the seventh possible implementation manner of the tenth aspect, in an eighth possible implementation manner of the tenth aspect, the first control unit is further specifically configured to determine scheduling of the first network device for the terminal device according to the power usage state and the scheduling limitation.

With reference to the tenth aspect or any one of the first to eighth possible implementation manners of the tenth aspect, in a ninth possible implementation manner of the tenth aspect, the device further includes:

a sending module, configured to send notification signaling to the terminal device, so that the terminal device sends, to the first network device, the PH and the maximum transmit power corresponding to the PH.

With reference to the tenth aspect or any one of the first to ninth possible implementation manners of the tenth aspect, in a tenth possible implementation manner of the tenth aspect, the sending module is further configured to send the signaling to the terminal device, where the signaling includes the channel configuration information.

According to an eleventh aspect, an embodiment of the present invention provides a network device, including:

a receiving module, configured to receive signaling sent by a second network device, where the second network device is a network device that controls a second cell; and the signaling includes a power headroom PH of the second cell corresponding to a terminal device and channel configuration information corresponding to the PH; and an acquiring module, configured to acquire, according to the PH and the channel configuration information, a power usage state of the second cell corresponding to the terminal device.

With reference to the eleventh aspect, in a first possible implementation manner of the eleventh aspect, the channel includes at least one of the following channels:

a physical uplink shared channel PUSCH and a physical uplink control channel PUCCH.

With reference to the eleventh aspect or the first possible implementation manner of the eleventh aspect, in a second possible implementation manner of the eleventh aspect, the channel configuration information includes at least one piece of the following information:

a quantity of resource blocks RBs, a scheduling grant manner, transmission format information, and channel sending state information.

With reference to the second possible implementation manner of the eleventh aspect, in a third possible implementation manner of the eleventh aspect, the scheduling grant manner includes at least one of the following manners:

a semi-persistent scheduling grant, a dynamic scheduling grant, and a random access response grant.

With reference to the second possible implementation manner of the eleventh aspect, in a fourth possible implementation manner of the eleventh aspect, the transmission format information includes at least one piece of the following information:

bits information of a PUSCH, whether a PUSCH carries only control information, a transmission format of a PUCCH, and bits information of PUCCH transmission.

With reference to the eleventh aspect or any one of the first to fourth possible implementation manners of the eleventh aspect, in a fifth possible implementation manner of the eleventh aspect, the device further includes:

a coordination module, configured to perform coordinated scheduling on the terminal device according to the power usage state.

With reference to the fifth possible implementation manner of the eleventh aspect, in a sixth possible implementation manner of the eleventh aspect, the coordination module includes:

a first control unit, configured to control scheduling of the second network device for the terminal device according to the power usage state, where the second network device is a network device that controls the second cell; and/or a second control unit, configured to control scheduling of the first network device for the terminal device according to the power usage state.

With reference to the sixth possible implementation manner of the eleventh aspect, in a seventh possible implementation manner of the eleventh aspect, the first control unit is specifically configured to:

calculate, according to the power usage state, a scheduling limitation under which the second network device can perform scheduling on the terminal device; and send control signaling to the second network device, where the control signaling includes the scheduling limitation.

With reference to the seventh possible implementation manner of the eleventh aspect, in an eighth possible implementation manner of the eleventh aspect, the first control unit is further specifically configured to determine scheduling of the first network device for the terminal device according to the power usage state and the scheduling limitation.

With reference to the eleventh aspect or any one of the first to eighth possible implementation manners of the eleventh aspect, in a ninth possible implementation manner of the eleventh aspect, the device further includes:

a sending module, configured to send notification signaling to the second network device, so that the second network device sends, to the first network device, the signaling that includes the power headroom PH of the second cell corresponding to the terminal device and the channel configuration information corresponding to the PH.

According to a twelfth aspect, an embodiment of the present invention provides a network device, including:

a receiving module, configured to: when channel transmission exists in a subframe of a second cell, wherein a power headroom PH corresponds to the subframe of the second cell, receive signaling sent by a second network device, where the second network device is a network device that controls the second cell; and the signaling includes the PH of the second cell corresponding to a terminal device and maximum transmit power corresponding to the PH; and an acquiring module, configured to acquire, according to the PH and the maximum transmit power, a power usage state of the second cell corresponding to the terminal device, where the PH is obtained through calculation by the terminal device based on pre-defined channel configuration information or based on channel configuration information configured by a signaling; and the maximum transmit power corresponding to the PH is maximum transmit power configured by the terminal device for the second cell in the subframe of the second cell corresponding to the PH.

With reference to the twelfth aspect, in a first possible implementation manner of the twelfth aspect, the channel includes at least one of the following channels:

a physical uplink shared channel PUSCH and a physical uplink control channel PUCCH.

With reference to the twelfth aspect or the first possible implementation manner of the twelfth aspect, in a second possible implementation manner of the twelfth aspect, the channel configuration information includes at least one piece of the following information:

a quantity of resource blocks RBs, a scheduling grant manner, transmission format information, and channel sending state information.

With reference to the second possible implementation manner of the twelfth aspect, in a third possible implementation manner of the twelfth aspect, the scheduling grant manner includes at least one of the following manners:

a semi-persistent scheduling grant, a dynamic scheduling grant, and a random access response grant.

With reference to the second possible implementation manner of the twelfth aspect, in a fourth possible implementation manner of the twelfth aspect, the transmission format information includes at least one piece of the following information:

bits information of a PUSCH, whether a PUSCH carries only control information, a transmission format of a PUCCH, and bits information of PUCCH transmission.

With reference to the twelfth aspect or any one of the first to fourth possible implementation manners of the twelfth aspect, in a fifth possible implementation manner of the twelfth aspect, the device further includes:

a coordination module, configured to perform coordinated scheduling on the terminal device according to the power usage state.

With reference to the fifth possible implementation manner of the twelfth aspect, in a sixth possible implementation manner of the twelfth aspect, the coordination module includes:

a first control unit, configured to control scheduling of the second network device for the terminal device according to the power usage state, where the second network device is a network device that controls the second cell; and/or a second control unit, configured to control scheduling on the terminal device according to the power usage state.

With reference to the sixth possible implementation manner of the twelfth aspect, in a seventh possible implementation manner of the twelfth aspect, the first control unit is specifically configured to:

calculate, according to the power usage state, a scheduling limitation under which the second network device can perform scheduling on the terminal device; and send control signaling to the second network device, where the control signaling includes the scheduling limitation.

With reference to the seventh possible implementation manner of the twelfth aspect, in an eighth possible implementation manner of the twelfth aspect, the first control unit is further specifically configured to determine scheduling of the first network device for the terminal device according to the power usage state and the scheduling limitation.

With reference to the twelfth aspect or any one of the first to eighth possible implementation manners of the twelfth aspect, in a ninth possible implementation manner of the twelfth aspect, the device further includes:

a sending module, configured to send notification signaling to the second network device, so that the second network device sends, to the first network device, the signaling that includes the PH and the maximum transmit power corresponding to the PH.

In the embodiments of the present invention, a terminal device determines a power headroom PH of a second cell corresponding to the terminal device, and sends, to the first network device, the PH and channel configuration information corresponding to the PH, so that the first network device acquires, according to the PH and the channel configuration information, a power usage state of the second cell corresponding to the terminal device. In this way, transmit power of UE between different network devices can be properly allocated, and therefore, system resources are properly used.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

FIG. 1 is a schematic diagram of a conventional CA technology;

FIG. 2 is a flowchart of Embodiment 1 of a power usage state information transmission method according to the present invention;

FIG. 3 is a flowchart of Embodiment 2 of a power usage state information transmission method according to the present invention;

DESCRIPTION OF EMBODIMENTS

Figure 4:
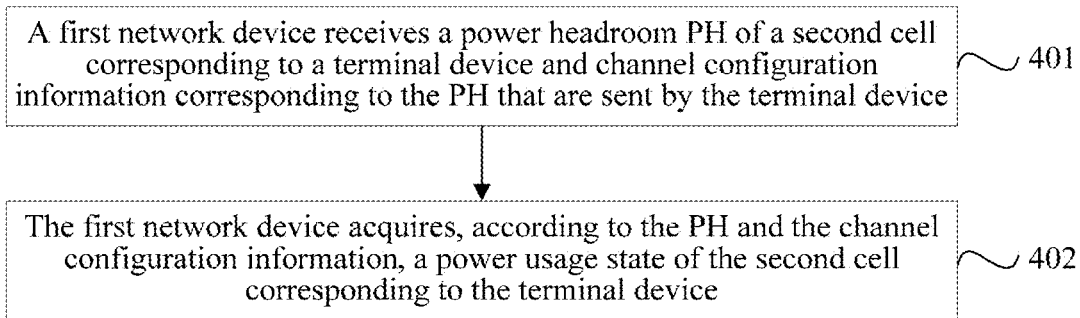
FIG. 4 is a flowchart of Embodiment 3 of a power usage state information transmission method according to the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

FIG. 2 is a flowchart of Embodiment 1 of a power usage state information transmission method according to the present invention. As shown in FIG. 2, the method of this embodiment may include:

Step 201: A terminal device determines a power headroom PH of a second cell corresponding to the terminal device.

Step 202: The terminal device sends, to a first network device, the PH and channel configuration information corresponding to the PH, where the first network device is a network device that controls a first cell.

In this embodiment of the present invention, the terminal device may be UE, and the network device may be an eNodeB. When the UE is located in a coverage area of cells controlled by two eNodeBs, the UE may be scheduled by these two eNodeBs. In this embodiment, for ease of description, it is stipulated that a cell controlled by a first eNodeB of these two eNodeBs is a first cell, and a cell controlled by a second eNodeB is a second cell. Optionally, when the UE is located in a coverage area of cells controlled by different units of a same network device, the UE may be scheduled by these two units. In this embodiment, for ease of description, it is stipulated that a cell controlled by a first unit of these two units is a first cell, and a cell controlled by a second unit is a second cell. In the following embodiments of the present invention, that UE is scheduled by two eNodeBs is used as an example. A value of total transmit power of UE needs to satisfy maximum transmit power determined by requirements in an aspect of human health, network configurations and the like; therefore, the UE may report, to a first network device that controls a first cell, a PH of a second cell corresponding to the UE, so that the first network device acquires information about residual power of the UE according to the PH reported by the UE. The PH includes a difference between the maximum transmit power of the UE and estimated uplink transmit power of the UE, and the PH may be determined by the UE based on a real transmit state of a PUSCH and/or PUCCH channel in the second cell.

The communications system is not in ideal backhaul, and the first network device cannot know, only according to the PH reported by the UE, channel transmission information such as a quantity of resource blocks RBs corresponding to the PH; therefore, in this embodiment of the present invention, the UE may further report channel configuration information corresponding to the PH while reporting the PH to the first network device, so that the first network device obtains, according to the PH and the channel configuration information corresponding to the PH, a power usage situation of the UE in a cell controlled by another network device, thereby performing coordinated scheduling on the UE. The channel includes at least one of the following channels: a PUSCH and a PUCCH. The channel configuration information is information related to channel transmission of the second network device controlling the second cell on the UE, and is continuously changed according to scheduling of the second network device for the UE. The channel configuration information may include at least one piece of the following information: a quantity of resource blocks RBs, a scheduling grant manner, transmission format information, and channel sending state information, and may also include other configuration information, such as a closed-loop power control adjustment value $f_c(i)$, which is not limited herein in the present invention. Optionally, the channel sending state may include whether to send a PUSCH and/or PUCCH. Optionally, when a Radio Resource Control (RRC) layer of the first network device controls both the first network device and the second network device, some parameters such as $P_{O\_PUSCH,c}(j)$ and $\alpha_c(j)$ of the second network device, related to a higher layer configuration are known to the first network device, and therefore, the UE does not need to report the foregoing parameters related to the higher layer configuration to the first network device. Optionally, if the foregoing parameters related to the higher layer configuration are unknown to the first network device, because the parameters are generally not dynamically changed by the higher layer configuration but changed semi-persistently, the first network device can still determine the power usage state of the UE according to the channel configuration information, and the UE does not need to report the foregoing parameters related to the higher layer configuration to the first network device.

Optionally, if at least one piece of information of the channel configuration information is pre-defined or signaling-configuration-based, that is, the pre-defined or signaling-configuration-based channel configuration information is known to the first network device (where the signaling is sent by the first network device to the UE), the UE does not need to send the pre-defined or signaling-configuration-based channel configuration information to the first network device, and the UE only needs to send information that is unknown to the first network device in the channel configuration information to the first network device, that is, the UE only needs to send information that is not pre-defined or not signaling-configuration-based in the channel configuration information to the first network device. Further, the scheduling grant manner includes at least one of the following manners: a semi-persistent scheduling grant, a dynamic scheduling grant, and a random access response grant, where the scheduling grant manner is denoted by using a value of a variable j, and j may be 0, 1, or 2; when j=0, the scheduling grant manner is the semi-persistent scheduling grant; when j=1, the scheduling grant manner is the dynamic scheduling grant; when j=2, the scheduling grant is the random access response grant. The transmission format information includes at least one piece of the following information: bits information of a PUSCH, whether a PUSCH carries only control information, a transmission format of a PUCCH, and bits information of PUCCH transmission. The bits information of the PUSCH may include bits per resource element (Bits Per Resource Element, BPRE for short) of the PUSCH and/or size information of a transport block carried in the PUSCH.

Optionally, for a manner in which the terminal device determines the power headroom PH of the second cell corresponding to the terminal device, specifically, the UE may obtain, based on the channel transmit state of the second network device, the PH through calculation by using the following formula.

In carrier aggregation, a PH is calculated and reported by UE for each cell, and two types of power headrooms (power headroom) are defined: Type1 and Type2.

(1) In the Type1 Manner:

when UE sends a PUSCH in a subframe i of a serving cell (cell, c for short), but does not send a PUCCH, $$PH_{type1,c}(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\}[dB] \quad (1)$$

where $P_{CMAX,c}(i)$ is maximum transmit power configured by the UE when a PUSCH channel is sent in the subframe i of the serving cell c;

when the UE sends a PUSCH and a PUCCH in the subframe i of the serving cell c, $$PH_{type1,c}(i) = \tilde{P}_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\}[dB] \quad (2)$$

where $P_{CMAX,c}(i)$ is maximum transmit power of the UE obtained when a PUSCH channel is sent but the UE assumes that only a PUCCH is transmitted in the subframe i of the serving cell c;

when the UE does not send a PUSCH in the subframe i of the serving cell c, the UE sends a virtual type1 (virtual type1) PH to a network device that controls the serving cell c, where the virtual type1 PH uses a reference format (reference format) of the PUSCH:

$$PH_{type1,c}(i) = \tilde{P}_{CMAX,c}(i) - \{P_{O\_PUSCH,c}(1) + \alpha_c(1) \cdot PL_c + f_c(i)\}[dB] \quad (3)$$

where $P_{CMAX,c}(i)$ is maximum transmit power of the UE in the subframe i of the serving cell c;

$\tilde{P}_{CMAX,c}(i)$ is maximum transmit power of the UE on the given assumption in the subframe i of the serving cell c;

$M_{PUSCH,c}(i)$ is a quantity of RBs allocated for the PUSCH in the subframe i;

$P_{O\_PUSCH,c}(j)$ is an open-loop power control adjustment value, a value of $P_{O\_PUSCH,c}(j)$ is determine by parameters, of a higher layer configuration of the serving cell c, corresponding to different values j, where a variable j is related to a scheduling grant manner of the PUSCH; when PUSCH transmission is granted by means of semi-persistent scheduling, j=0; when PUSCH transmission is granted by means of dynamic scheduling, j=1; when PUSCH transmission is granted by means of a random access response, j=2;

$\alpha_c(j)$ is a partial path loss compensation value that is jointly determined by a parameter of a higher layer configuration and a variable j, where when j=0 or 1, $\alpha_c(j)$ is determined by the parameter of the higher layer configuration of the serving cell c; when j=2, $\alpha_c(j)=1$;

$PL_c$ is a path loss of the serving cell c obtained through measurement by the UE;

$\Delta_{TF,c}(i)$ is a transmission format compensation value that is obtained through calculation according to BPRE of a code word flow sent by the UE, a parameter Ks and $\beta_{offset}^{PUSCH}$ by using a formula $\Delta_{TF,c}(i)=10\ \log_{10}\ ((2^{BPRE\cdot K_s}-1)\cdot \beta_{offset}^{PUSCH})$, where Ks is the parameter of the higher layer configuration and a value of Ks may be 1.25 or 0, and BPRE is obtained through calculation according to a quantity of bits carried in user data and a quantity of resource elements (Resource Element, RE for short) allocated for the user data; a specific calculation formula is as follows:

when the PUSCH only carries control information, $BPRE=O_{CQI}/N_{RE}$, where $O_{CQI}$ is CQI/PMI bits including a CRC bit, and $N_{RE}$ is a quantity of REs; if it is not the case in which the PUSCH only carries control information, $$BPRE = \sum_{r=0}^{C-1} K_r/N_{RE},$$

where C is a quantity of code blocks of user data of an uplink PUSCH, and a code block size of an $r^{th}$ code block is Kr; when the PUSCH only carries control information, $\beta_{offset}^{PUSCH}=\beta_{offset}^{COI}$ where $\beta_{offset}^{COI}$ is the parameter of the higher layer configuration; if it is not the case in which the PUSCH only carries control information, $\beta_{offset}^{PUSCH}=1$; and $f_c(i)$ is a closed-loop power control adjustment value determined by a power control command sent by a base station.

(2) In the Type2 Manner:

when UE sends both a PUSCH and a PUCCH in a subframe i of a Pcell, $$PH_{type2}(i) = P_{CMAX,c}(i) - \qquad(4)$$

$$10\log_{10}\left(10^{\left(\begin{array}{c}10\log_{10}(M_{PUSCH,c}(i))+P_{O\_PUSCH,c}(j)+\\ \alpha_c(j)\cdot PL_c+\Delta_{TF,c}(i)+f_c(i)\end{array}\right)/10} + 10^{\left(\begin{array}{c}P_{0\_OUCCH}+PL_c+h(n_{CQI},n_{HARQ},n_{SR})+\\ \Delta_{F\_PUCCH}(F)+\Delta_{TxD}(F')+g(i)\end{array}\right)/10}\right)[dB]$$

when UE sends a PUSCH but does not send a PUCCH in the subframe i of the Pcell, $$PH_{type2}(i) = P_{CMAX,c}(i) - \qquad(5)$$

$$10\log_{10}\left(10^{\left(\begin{array}{c}10\log_{10}(M_{PUSCH,c}(i))+P_{O\_PUSCH,c}(j)+\\ \alpha_c(j)\cdot PL_c+\Delta_{TF,c}(i)+f_c(i)\end{array}\right)/10} + 10^{(P_{0\_PUCCH}+PL_c+g(i))/10}\right)[dB]$$

when UE sends a PUCCH but does not send a PUSCH in the subframe i of the Pcell, $$PH_{type2}(i) = \qquad(6)$$

$$P_{CMAX,c}(i) - 10\log_{10}\left(10^{(P_{O\_PUSCH,c}(1)+\alpha_c(1)\cdot PL_c+f_c(i))/10} + 10^{\left(\begin{array}{c}P_{0\_PUCCH}+PL_c+h(n_{CQI},n_{HARQ},n_{SR})+\\ \Delta_{F\_PUCCH}(F)+\Delta_{TxD}(F')+g(i)\end{array}\right)/10}\right)[dB]$$

when the UE sends neither PUSCH nor PUCCH in the subframe i of the Pcell, the UE sends a virtual type2 (virtual type2) PH to a network device that controls the Pcell cell, where the virtual type2 PH uses a reference format of the PUSCH and the PUCCH:

$$PH_{type2}(i) = \qquad(7)$$

$$\tilde{P}_{CMAX,c}(i) - 10\log_{10}\left(10^{(P_{O\_PUSCH,c}(1)+\alpha_c(1)\cdot PL_c+f_c(i))/10} + 10^{(P_{0\_PUCCH}+PL_c+g(i))/10}\right)[dB]$$

where $\Delta_{F\_PUCCH}$ (F) is a parameter related to a PUCCH format, and is determined by a parameter of a higher layer configuration;

$h(n_{CQI}, n_{HARQ}, n_{SR})$ is a variable related to the PUCCH format, where $n_{CQI}$ is bits of a CQI; if it is configured that the subframe i can transmit a scheduling request (Scheduling Request, SR for short), $n_{SR}=1$; if it is not configured that the subframe i can transmit a scheduling request, $n_{SR}=0$, where $n_{HARQ}$ is related to a quantity of serving cells configured by the UE, a PUCCH format of PUCCH transmission and a quantity of HARQ-ACK bits; in different PUCCH formats, $h(n_{CQI}, n_{HARQ}, n_{SR})$ is obtained through calculation according to values of corresponding $n_{CQI}, n_{HARQ}$, and $n_{SR}$, where a calculation formula of $h(n_{CQI}, n_{HARQ}, n_{SR})$ is of the prior art, and details are not described herein again;

$P_{O\_PUCCH}$ is an open-loop power control adjustment value, and is determined by an RRC configuration parameter;

$\Delta_{TxD}(F')$ is a parameter related to a quantity of antenna ports that send the PUCCH and the PUCCH format, where when the PUCCH is sent by using two antenna ports, $\Delta_{TxD}(F')$ is a parameter related to the PUCCH format, and is configured for the UE by a higher layer by using dedicated signaling; if the PUCCH is not sent by using two antenna ports, $\Delta_{TxD}(F')=0$; and $g(i)$ is a closed-loop power control adjustment value determined by a power control command sent by a base station.

Therefore, the UE may obtain, through calculation according to a channel transmission situation (such as a PUSCH and/or PUCCH transmission situation) of the UE in a subframe of a serving cell by using the formula in the foregoing Type1 manner, the PH of the second cell corresponding to the UE; when the second cell is a Pcell, the UE may obtain, through calculation according to a channel transmission situation (such as a PUSCH and/or PUCCH transmission situation) of the UE in a subframe of the Pcell by using the formula in the foregoing Type2 manner, the PH of the second cell corresponding to the UE.

Further, before the determining, by a terminal device, a PH of a second cell corresponding to the terminal device, the method further includes:

receiving, by the terminal device, notification signaling sent by the first network device, where the notification signaling is used for instructing the terminal device to send, to the first network device, the PH of the second cell corresponding to the terminal device and the channel configuration information corresponding to the PH.

In this embodiment of the present invention, when the UE determines that the PH of the second cell corresponding to the UE and the channel configuration information corresponding to the PH need to be sent to the first network device, the UE sends the PH and the channel configuration information to the first network device. Specifically, a manner in which the UE determines that the PH of the second cell corresponding to the UE and the channel configuration information need to be sent to the first network device may be the following two implementable manners. A first implementable manner is: if it is stipulated in the communications system that the UE sends, to the first network device at intervals, the PH of the second cell corresponding to the UE and the channel configuration information corresponding to the PH, the UE may need to send the PH and the channel configuration information at intervals according to the stipulation. A second implementable manner is: after the UE receives an instruction of the first network device, for example, after the UE receives notification signaling sent by the first network device, the UE determines that the PH of the second cell corresponding to the UE and the channel configuration information corresponding to the PH need to be sent to the first network device, where the notification signaling includes an instruction for instructing the UE to send, to the first network device, the PH of the second cell corresponding to the UE and the channel configuration information. In addition, the manner in which the UE determines that the PH of the second cell corresponding to the UE and the channel configuration information need to be sent to the first network device may also be another manner, which is not limited herein in this embodiment of the present invention.

It is mentioned in the proposal R2-134234 of 3GPP that, because a connection between eNodeBs is in non-ideal backhaul, if it is intended to enable an eNodeB to know residual power, of UE, in another eNodeB, the eNodeBs are required to mutually know a PH, of the UE, in a cell controlled by another eNodeB, that is, the eNodeBs exchange PHs reported by the UE. The PHs may be exchanged by means of sending performed by the UE or by means of backhaul sending performed by the eNodeBs. In addition, the PH exchange helps avoid a problem that maximum transmit power of the UE is exceeded or power utilization of the UE is low caused by scheduling of two eNodeBs for the UE. However, in the R2-134234 proposal, an eNodeB cannot accurately obtain a future power usage and residual power situation of the cell according to a PH of a cell in another eNodeB, and can only speculate the situation. Therefore, the method provided in R2-134234 is only used for exchanging PHs between eNodeBs, but cannot resolve a problem to be resolved by the present invention that an eNodeB is enabled to acquire a power usage situation, of UE, in another eNodeB.

Optionally, if it is a heterogeneous network scenario in this embodiment of the present invention, an example in which a macro cell and a small cell form CA to serve UE is used, where the macro cell and the small cell use different carriers, an eNodeB that controls the macro cell is a MeNodeB, and an eNodeB that controls the small cell is a SeNodeB. A non-ideal backhaul connection is between the MeNodeB and the SeNodeB, and therefore, the CA may be considered as non-ideal backhaul CA. In addition, in each eNodeB, multiple cells on different carriers may form ideal backhaul CA to serve the UE. The UE reports, to the macro cell (correspondingly referred to as the first cell), a PH of the small cell (that is, correspondingly referred to as the second cell) and channel configuration information corresponding to the PH.

A base line defined in this embodiment of the present invention is that UE supporting downlink dual-connection can support uplink dual-transmission, that is, the UE supports simultaneous transmission in uplinks corresponding to two downlink cells. Non-ideal backhaul is between the macro cell and the small cell, and control information that is related to downlink transmission and fed back by the UE cannot be exchanged between cells in time; therefore, the UE is required to send PUCCHs respectively in uplinks of the macro cell and the small cell, in order to feedback UE's control information related to downlink transmissions of the small cell and the macro cell respectively, such as acknowledgement/negative acknowledgement (Acknowledgement/Negative Acknowledgement, ACK/NACK for short). Optionally, if the uplinks of the macro cell and the small cell are not configured as CA, the UE sends a PUSCH and a PUCCH in an uplink of a cell, and sends only a PUCCH in an uplink of another cell; if the uplinks of the macro cell and the small cell are configured as CA, the UE may send a PUSCH and a PUCCH in both uplinks of two cells.

Optionally, in this embodiment of the present invention, if the UE may report a type2 PH of a cell of non-CA configuration or a type2 PH of a Scell of CA configuration (the prior art supports only reporting a type2 PH of a Pcell of CA configuration). Optionally, the channel configuration information in the foregoing embodiment may further include information related to a PUCCH, such as a PUCCH format.

In this embodiment of the present invention, a terminal device determines a power headroom PH of a second cell corresponding to the terminal device, and sends, to the first network device, the PH and channel configuration information corresponding to the PH, so that the first network device acquires, according to the PH and the channel configuration information, a power usage state of the second cell corresponding to the terminal device. In this way, transmit power of UE between different network devices can be properly allocated, and therefore, system resources are properly used.

FIG. 3 is a flowchart of Embodiment 2 of a power usage state information transmission method according to the present invention. As shown in FIG. 3, the method of this embodiment may include:

Step 301: When channel transmission exists in a subframe of a second cell, wherein a power headroom PH corresponds to the subframe of the second cell, a terminal device determines the power headroom PH of the second cell corresponding to the terminal device.

Step 302: The terminal device sends, to the first network device, the PH and maximum transmit power corresponding to the PH, where the first network device is a network device that controls a first cell; the PH is obtained through calculation by the terminal device based on pre-defined channel configuration information or based on channel configuration information configured by a signaling; and the maximum transmit power corresponding to the PH is maximum transmit power configured by the terminal device for the second cell in the subframe of the second cell corresponding to the PH.

In this embodiment of the present invention, the terminal device may be UE, and the network device may be an eNodeB. Different from Embodiment 1 of the power usage state information transmission method according to the present invention, in this embodiment of the present invention, when channel transmission exists in a subframe of the second cell, wherein the PH corresponds to the subframe of the second cell, that is, when the terminal device transmits a channel in the subframe of the second cell, wherein the PH corresponds to the subframe of the second cell, the UE sends, to the first cell, the power headroom PH of the second cell corresponding to the UE and the maximum transmit power corresponding to the PH, so that the first network device acquires, according to the PH and the maximum transmit power, a power usage state of the second cell corresponding to the UE, and the UE is not required to report both the PH obtained through calculation by the UE based on real transmission in a corresponding subframe of the second cell and corresponding channel configuration information. The maximum transmit power corresponding to the PH is maximum transmit power configured by the terminal device for the second cell in the subframe of the second cell corresponding to the PH, that is, the maximum transmit power is known to the UE; the PH is a PH obtained through calculation by the UE based on the pre-defined channel configuration information or based on the channel configuration information configured by the signaling. Optionally, in an implementable manner, a variable included in the channel configuration information is pre-defined as a fixed value of a reference configuration, and the PH is obtained through calculation in the pre-defined reference configuration. In another implementable manner, the UE may obtain the PH through calculation according to channel configuration information configured in received higher layer signaling or physical layer signaling, where the higher layer signaling or the physical layer signaling includes the channel configuration information; optionally, the higher layer signaling may be sent by the first network device. In addition, the PH in Embodiment 1 of the foregoing power usage state information transmission method is a PH obtained through calculation by the UE based on a real transmission situation in a corresponding subframe of the second cell. The channel includes at least one of the following channels: a PUSCH and a PUCCH. The channel configuration information may include at least one piece of the following information: a quantity of resource blocks RBs, a scheduling grant manner, transmission format information, and channel sending state information, and may also include other configuration information, such as a closed-loop power control adjustment value $f_c(i)$, which is not limited herein in the present invention. Optionally, the channel sending state may include whether to send a PUSCH and/or PUCCH. The scheduling grant manner includes at least one of the following manners: a semi-persistent scheduling grant, a dynamic scheduling grant, and a random access response grant, and the scheduling grant manner is denoted by using a value of a variable j, where j is 0, 1, or 2. The transmission format information includes at least one piece of the following information: bits information of a PUSCH, whether a PUSCH carries only control information, a transmission format of a PUCCH, and bits information of PUCCH transmission. The bits information of a PUSCH may include BPRE of the PUSCH and/or size information of a transport block carried in the PUSCH.

Optionally, when the PH is a type1 PH, a PUSCH may be included during channel transmission; when the PH is a type2 PH, a PUSCH or PUCCH channel may be included during channel transmission.

Optionally, for a manner in which the terminal device determines the power headroom PH of the second cell corresponding to the terminal device, specifically, the terminal device may obtain the PH through calculation based on the pre-defined channel configuration information or based on the channel configuration information configured by a signaling in a manner as follows:

If the pre-definition-based or signaling-configuration-based channel configuration information (that is, channel configuration information known to the first network device), such as the pre-defined or signaling-configured channel configuration information may be information such as a quantity of RBs of a PUSCH, a scheduling grant manner being dynamic scheduling, transmission format information and a channel sending state of the UE, for example, the quantity of the RBs of the PUSCH is two, the scheduling grant manner is dynamic scheduling, i.e. j=1, and the transmission format information of the UE is BPRE, the UE does not send a PUCCH channel. Optionally, the UE puts the foregoing information into the formula (1) in Embodiment 1 to obtain the PH. For details of a specific calculation manner, refer to the foregoing embodiment.

Optionally, the foregoing channel configuration information may include: for example, the quantity of the RBs of the PUSCH is 1; the scheduling grant manner is a dynamic scheduling grant (that is, j=1); BPRE is pre-defined as a fixed value; $\Delta_{TF,c}(i)$ may be obtained by combining the BPRE with a parameter of a higher layer configuration, or it is directly pre-defined that $\Delta_{TF,c}(i)=0$; and the UE does not send a PUCCH. Optionally, it may be further assumed in the reference configuration that parameters, of the UE, related to transmit power in a serving cell c, for example, maximum power reduction (MPR) is 0 dB, additional maximum power reduction (A-MPR) is 0 dB, power management maximum power reduction (P-MPR) is 0 dB, and TC=0 dB; and it is assumed according to the parameters that maximum transmit power of the serving cell c obtained through calculation is $\tilde{P}_{CMAX,c}(i)$, where TC is a parameter related to a band edge transmit power limitation. The obtained $\tilde{P}_{CMAX,c}(i)$ is not related to the channel transmission situation of the UE, and therefore is a type of virtual maximum transmit power.

Optionally, in the foregoing reference configuration, the UE may obtain, based on the pre-defined channel configuration information or the channel configuration information configured by the signaling, the PH by using the following calculation formula.

$$PH=P_{CMAX,c}(i)-\{P_{O\_PUSCH,c}(1)+\alpha_c(1)\cdot PL_c+f_c(i)\}[dB] \quad (8)$$

where $P_{CMAX,c}(i)$ is maximum transmit power obtained through configuration by the UE according to a real channel transmission situation.

Optionally, in the foregoing reference configuration, the UE may further obtain, based on the pre-defined channel configuration information or the channel configuration information configured by a signaling, the PH by using the following calculation formula.

$$PH=\tilde{P}_{CMAX,c}(i)-\{P_{O\_PUSCH,c}(1)+\alpha_c(1)PL_c+f_c(i)\}[dB] \quad (9)$$

where $\tilde{P}_{CMAX,c}(i)$ is virtual maximum transmit power based on the parameter assumption.

Meanings of other parameters in the formula (8) and the formula (9) are the same as those of the parameters in Embodiment 1.

Optionally, when maximum transmit power (real maximum transmit power) used when the PH is calculated is $P_{CMAX,c}(i)$, that is, when the foregoing formula (8) is used, the UE needs to send, to the first network device, the PH and the maximum transmit power corresponding to the PH (because the real maximum transmit power is unknown to the first network device), so that the first network device learns a power usage situation, of the UE, in the second network device more accurately.

Optionally, when maximum transmit power (virtual maximum transmit power) used when the PH is calculated is $\tilde{P}_{CMAX,c}(i)$, that is, when the foregoing formula (9) is used, after the UE determines that the PH of the second cell corresponding to the UE needs to be sent to the first network device, the PH needs to be sent to the first network device, and the maximum transmit power corresponding to the PH (because the virtual maximum transmit power may be pre-defined, the virtual maximum transmit power is known to the first network device) does not need to be sent to the first network device.

The channel parameter in the formula (9) is the same as the channel configuration in the formula (3) of Embodiment 1 of the foregoing power usage state information transmission method, and therefore, the formula (9) is the same as the formula (3) of Embodiment 1 of the foregoing power usage state information transmission method. Optionally, if the reference configuration in this embodiment is different from the reference configuration of the formula (3), a correspondingly obtained formula is different from the formula (3), and details are not described herein again in this embodiment.

In the foregoing reference configuration, the foregoing formula (9) is similar to the formula (3) in the prior art. However, in the prior art, only when no PUSCH is sent in the subframe corresponding to the reported PH, the UE sends a virtual type1 PH to the serving network device, and the virtual type1 PH uses the reference format of the PUSCH. Therefore, in this embodiment, when a channel is transmitted, the PH reported by the UE is a PH obtained through calculation still according to the reference configuration and then is reported, rather than a PH obtained through calculation according to a real sending situation of the PUSCH in a subframe corresponding to the second cell. In this case, the first network device may estimate a power usage state, of the UE, in the second network device such as power needed by each RB of the PUSCH without knowing the real sending situation of the PUSCH, of the UE, in the subframe of the second cell corresponding to the PH, so that the first network device further performs coordinated scheduling on the UE according to the power usage state.

In this embodiment of the present invention, the PH calculation formula obtained based on the foregoing reference configuration is only used as an example, and a specific reference configuration and a corresponding PH calculation formula are not limited herein in this embodiment of the present invention (because when reference configurations differ, optionally, the PH calculation formulas obtained after the configuration information is put into the formula in Embodiment 1 also differ).

Further, before the determining, by a terminal device, a PH of a second cell corresponding to the terminal device, the method further includes:

receiving, by the terminal device, notification signaling sent by the first network device, where the notification signaling is used for instructing the terminal device to send, to the first network device, the PH of the second cell corresponding to the terminal device and the maximum transmit power corresponding to the PH.

In this embodiment of the present invention, when the UE determines that the PH of the second cell corresponding to the UE needs to be sent to the first network device, and the UE transmits a channel in a subframe corresponding to the second cell, the UE sends, to the first network device, the PH and the maximum transmit power corresponding to the PH. Specifically, a manner in which the UE determines that the PH of the second cell corresponding to the UE needs to be sent to the first network device may be the following two implementable manners. A first implementable manner is: if it is stipulated in the communications system that the UE sends, to the first network device at intervals, the PH of the second cell corresponding to the UE and the maximum transmit power corresponding to the PH, the UE may need to send the PH and the maximum transmit power corresponding to the PH at intervals according to the stipulation. A second implementable manner is: after the UE receives an instruction of the first network device, for example, after the UE receives notification signaling sent by the first network device, the UE determines that the PH of the second cell corresponding to the UE and the maximum transmit power corresponding to the PH need to be sent to the first network device, where the notification signaling includes an instruction for instructing the UE to send, to the first network device, a message of the PH of the second cell corresponding to the UE. In addition, the manner in which the UE determines that the PH of the second cell corresponding to the UE needs to be sent to the first network device may also be another manner, which is not limited herein in this embodiment of the present invention.

Optionally, before the sending, by the terminal device to the first network device, the PH and maximum transmit power corresponding to the PH, the method further includes: receiving, by the terminal device, the signaling, where the signaling includes the channel configuration information.

In this embodiment of the present invention, the signaling may be higher layer signaling, that is, may be signaling sent by the first network device, or may be physical layer signaling, where the higher layer signaling or the physical layer signaling includes the channel configuration information.

It is mentioned in the proposal R2-133945 of 3GPP that, in a CA technology of non-ideal backhaul, schedulers of two network devices connected to UE are independent from each other. Because a scheduler does not know when the other scheduler performs scheduling on the UE and how to perform scheduling on the UE, when either of schedulers independently perform uplink scheduling grant on the UE, a case in which transmit power of the UE exceeds maximum transmit power of the UE may occur, and power compression is caused. To avoid occurrence of this case, the proposal R2-133945 provides a method, where a MeNodeB needs to obtain a PH of another SeNodeB corresponding to UE. The proposal also proposes that, the MeNodeB does not know an uplink resource allocation situation corresponding to the PH of the another SeNodeB, and therefore, a virtual PH of the another SeNodeB needs to be calculated based on a fixed channel configuration, and the virtual PH needs to be reported to the MeNodeB. However, the UE reports a PH without distinguishing whether there is channel transmission. For example, it is stipulated in the 3GPP Release 11 standard that maximum transmit power used when UE calculates the virtual PH is virtual maximum transmit power that is not obtained through configuration according to a real channel transmission situation. Therefore, the virtual maximum transmit power is known to a MeNodeB, and does not need to be reported to the MeNodeB together with the PH. This embodiment is different from the method provided in R2-133945: when the UE calculates a second PH of a SeNodeB, the UE obtains maximum transmit power through configuration according to a real channel transmission situation; the maximum transmit power is unknown to the MeNodeB, and consequently, the UE needs to report corresponding maximum transmit power to the MeNodeB while reporting the second PH. Compared with the method provided in R2-133945, the MeNodeB may obtain maximum transmit power and a PH obtained through calculation by using the maximum transmit power, which are obtained by UE according to a real channel transmission situation at the SeNodeB, so that the UE learns the power usage situation in the SeNodeB more accurately. Optionally, the channel configuration information used for calculating the PH may be configured by using signaling. Compared with a pre-defined fixed channel configuration, in the signaling-configuration-based manner in the present invention, the channel configuration information used for calculating the PH can be flexibly configured, so as to enable the first network device to learn power usage situations in different cases. For example, channel configuration information in different scheduling grant manners may be configured, and the first network device is enabled to learn power usage situations of the UE in different scheduling grant manners of the second network device.

Optionally, in this embodiment of the present invention, if the UE may report a type2 PH of a cell of non-CA configuration or a type2 PH of a Scell of CA configuration (the prior art supports only reporting a type2 PH of a Pcell of CA configuration). Optionally, the channel configuration information in the foregoing embodiment may further include information related to a PUCCH, such as a PUCCH format. Optionally, in this embodiment, a variable that is related to the PUCCH and that is included in the pre-definition-based channel configuration information may be further pre-defined as a fixed value, such as $h(n_{CQI}, n_{HARQ}, n_{SR})$, $\Delta_{F\_PUCCH}(F)$, or $\Delta_{TxD}(F')$ in the foregoing formulas (4) and (6). For example, when the reference configuration for calculating the second PH is the same as the reference configuration used in the formula (7) in Embodiment 1 of the foregoing power usage state information transmission method, the calculation formula of the second PH is also the same as the formula (7).

In this embodiment of the present invention, when channel transmission exists in a subframe of a second cell, wherein a power headroom PH corresponds to the subframe of the second cell, a terminal device determines the power headroom PH of the second cell corresponding to the terminal device, and sends, to the first network device, the PH and maximum transmit power corresponding to the PH, so that the first network device acquires, according to the PH and the maximum transmit power corresponding to the PH, a power usage state of the second cell corresponding to the terminal device. In this way, transmit power of UE between different network devices can be properly allocated, and therefore, resources are properly used.

Further, the method of this embodiment may include: determining, by the terminal device, that a second power headroom report PH of the second cell corresponding to the terminal device needs to be sent to the first network device; and regardless of whether the terminal device transmits a channel in the second cell, sending the second PH to the first network device, where the second PH is obtained through calculation by the terminal device based on the pre-defined channel configuration information or the channel configuration information configured by the signaling.

In this embodiment of the present invention, the terminal device may be UE. Different from Embodiment 1 of the power usage state information transmission method according to the present invention, in this embodiment of the present invention, the UE sends a second power headroom report PH of the second cell corresponding to the UE only to the first network device, and the UE is not required to report channel configuration information corresponding to the PH obtained through calculation by the UE according to real transmission in a corresponding subframe of the second cell. The second PH is a virtual PH obtained through calculation by the UE based on the pre-defined channel configuration information or the channel configuration information configured by the signaling. That is, in an implementable manner, a variable included in the channel configuration information is pre-defined as a fixed value of a reference configuration, and the second PH is obtained through calculation in the pre-defined reference configuration. In another implementable manner, the UE may obtain the second PH through calculation according to channel configuration information configured in received higher layer signaling or physical layer signaling, where the higher layer signaling or the physical layer signaling includes the channel configuration information; optionally, the higher layer signaling may be sent by the first network device. In addition, the first PH in Embodiment 1 of the foregoing power usage state information transmission method is a PH obtained through calculation by the UE based on a real transmission situation of the UE in a corresponding subframe of the second cell. The channel includes a PUSCH and/or a PUCCH. The channel configuration information may include at least one piece of the following information: a quantity of resource blocks RBs, a scheduling grant manner, transmission format information, and channel sending state information, and may also include other configuration information, such as a closed-loop power control adjustment value $f_c(i)$, which is not limited herein in the present invention. Optionally, the channel sending state may include whether to send a PUSCH and/or PUCCH. The scheduling grant manner includes at least one of the following manners: a semi-persistent scheduling grant, a dynamic scheduling grant, and a random access response grant, and the scheduling grant manner is denoted by using a value of a variable j, where j is 0, 1, or 2. The transmission format information includes at least one piece of the following information: bits information of a PUSCH, whether a PUSCH carries only control information, a transmission format of a PUCCH, and bits information of PUCCH transmission. The bits information of a PUSCH may include BPRE of the PUSCH and/or size information of a transport block carried in the PUSCH.

Further, before the determining, by the terminal device, that a second PH of the second cell corresponding to the terminal device needs to be sent to the first network device, the method further includes:

receiving, by the terminal device, notification signaling sent by the first network device, where the notification signaling is used for instructing the terminal device to send, to the first network device, the second PH of the second cell corresponding to the terminal device.

In this embodiment of the present invention, when the UE determines that the second PH of the second cell corresponding to the UE needs to be sent to the first network device, and regardless of whether the UE transmits a channel in the second cell, the UE sends the second PH to the first network device. Specifically, a manner in which the UE determines that the second PH of the second cell corresponding to the UE needs to be sent to the first network device may be the following two implementable manners. A first implementable manner is: if it is stipulated in the communications system that the UE sends, to the first network device at intervals, the second PH of the second cell corresponding to the UE, the UE may need to send the second PH at intervals according to the stipulation. A second implementable manner is: after the UE receives an instruction of the first network device, for example, after the UE receives notification signaling sent by the first network device, the UE determines that the second PH of the second cell corresponding to the UE needs to be sent to the first network device, where the notification signaling includes an instruction for instructing the UE to send, to the first network device, the second PH of the second cell corresponding to the UE. In addition, the manner in which the UE determines that the second PH of the second cell corresponding to the UE needs to be sent to the first network device may also be another manner, which is not limited herein in this embodiment of the present invention.

Optionally, before the sending, by the terminal device, the second PH to the first network device, the method further includes: receiving, by the terminal device, the signaling, where the signaling includes the channel configuration information.

In this embodiment of the present invention, the signaling may be higher layer signaling, that is, may be signaling sent by the first network device, or may be physical layer signaling, where the higher layer signaling or the physical layer signaling includes the channel configuration information.

Optionally, the foregoing channel configuration information may include: for example, the quantity of the RBs of the PUSCH is 1; the scheduling grant manner is a dynamic scheduling grant (that is, j=1); BPRE is pre-defined as a fixed value; $\Delta_{TF,c}(i)$ may be obtained by combining the BPRE with a parameter of a higher layer configuration, or it is directly pre-defined that $\Delta_{TF,c}(i)=0$; and the UE does not send a PUCCH. Optionally, it may be further assumed in the reference configuration that parameters, of the UE, related to transmit power in a serving cell c, for example, maximum power reduction (MPR) is 0 dB, additional maximum power reduction (A-MPR) is 0 dB, power management maximum power reduction (P-MPR) is 0 dB, and $T_C=0$ dB; and it is assumed according to the parameters that maximum transmit power of the serving cell c obtained through calculation is $\tilde{P}_{CMAX,c}(i)$, where $T_C$ is a parameter related to a band edge transmit power limitation.

Optionally, in the foregoing reference configuration, the UE may obtain, based on the pre-defined channel configuration information or the channel configuration information configured by the signaling, the second PH by using the following calculation formula.

$$PH_{type1,c}(i)=\tilde{P}_{CMAX,c}(i)-\{P_{O\_PUSCH,c}(1)+\alpha_c(1)\cdot PL_c+f_c(i)\}[dB]$$

where $\tilde{P}_{CMAX,c}(i)$ is virtual maximum transmit power based on the parameter assumption.

Meanings of other parameters in the formula are the same as those of the parameters in Embodiment 1.

Optionally, the channel parameter in the formula is the same as the channel configuration in the formula (3) of Embodiment 1 of the foregoing power usage state information transmission method, and therefore, the formula is the same as the formula (3) of Embodiment 1 of the foregoing power usage state information transmission method. Optionally, if the reference configuration in this embodiment is different from the reference configuration of the formula (3), a correspondingly obtained formula is different from the formula (3), and details are not described herein again in this embodiment.

In the foregoing reference configuration, the foregoing formula is similar to the formula (3) in the prior art. However, in the prior art, only when no PUSCH is sent in the subframe corresponding to the reported PH, the UE sends a virtual type1 PH to the serving cell, and the virtual type1 PH uses the reference format of the PUSCH. Therefore, in this embodiment, the second PH reported by the UE is a virtual PH obtained through calculation according to the reference configuration, rather than a PH obtained through calculation according to a real sending situation of the PUSCH in a subframe corresponding to the second cell. In this case, the first network device may estimate a power usage state, of the UE, in the second network device such as power needed by each RB of the PUSCH without knowing the real sending situation of the PUSCH, of the UE, in the subframe of the second cell corresponding to the PH, so that the first network device further performs coordinated scheduling on the UE according to the power usage state.

In this embodiment of the present invention, the second-PH calculation formula obtained based on the foregoing reference configuration is only used as an example, and a specific reference configuration and a corresponding second-PH calculation formula are not limited herein in this embodiment of the present invention.

Optionally, in this embodiment of the present invention, if the UE may report a type2 PH of a cell of non-CA configuration or a type2 PH of a Scell of CA configuration (the prior art supports only reporting a type2 PH of a Pcell of CA configuration). Optionally, the channel configuration information in the foregoing embodiment may further include information related to a PUCCH, such as a PUCCH format. Optionally, in this embodiment, a variable that is related to the PUCCH and that is included in the pre-definition-based channel configuration information may be further pre-defined as a fixed value, such as $h(n_{CQI}, n_{HARQ}, n_{SR})$, $\Delta_{F\_PUCCH}(F)$, or $\Delta_{TxD}(F')$ in the foregoing formulas (4) and (6). For example, when the reference configuration for calculating the second PH is the same as the reference configuration used in the formula (7) in Embodiment 1 of the foregoing power usage state information transmission method, the calculation formula of the second PH is also the same as the formula (7).

In this embodiment of the present invention, when a terminal device determines that a second power headroom report PH of a second cell corresponding to the terminal device needs to be sent to a first network device, regardless of whether a channel is transmitted in the second cell, the terminal device sends the second PH to the first network device, so that the first network device acquires, according to the second PH, a power usage state of the second cell corresponding to the terminal device. In this way, transmit power of UE between different network devices can be properly allocated, and therefore, resources are properly used.

FIG. 4 is a flowchart of Embodiment 3 of a power usage state information transmission method according to the present invention. As shown in FIG. 4, the method of this embodiment may include:

Step 401: A first network device receives a power headroom PH of a second cell corresponding to a terminal device and channel configuration information corresponding to the PH that are sent by the terminal device, where the first network device is a network device that controls a first cell.

Step 402: The first network device acquires, according to the PH and the channel configuration information, a power usage state of the second cell corresponding to the terminal device.

This embodiment of the present invention may be performed by the first network device that controls the first cell, and correspondingly, a second network device controls the second cell; or, this embodiment is performed by a first unit of a network device that controls the first cell, correspondingly, a second unit of the network device controls the second cell, and the terminal device in this embodiment may be UE.

In this embodiment of the present invention, the communications system is not in ideal backhaul, and the first network device cannot learn, only according to the PH reported by the UE, channel transmission information corresponding to the PH, such as a quantity of resource blocks RBs; therefore, in this embodiment of the present invention, the first network device may further receive the channel configuration information corresponding to the PH while receiving the power headroom PH, sent by the UE, of the second cell corresponding to the UE. The channel includes at least one of the following channels: a PUSCH and a PUCCH. The channel configuration information may include at least one piece of the following information: a quantity of resource blocks RBs, a scheduling grant manner, transmission format information, and channel sending state information, and may also include other configuration information, such as a closed-loop power control adjustment value $f_c(i)$, which is not limited herein in the present invention. Optionally, the channel sending state may include whether to send a PUSCH and/or PUCCH. The scheduling grant manner includes at least one of the following manners: a semi-persistent scheduling grant, a dynamic scheduling grant, and a random access response grant, and the scheduling grant manner is denoted by using a value of a variable j, where j is 0, 1, or 2. The transmission format information includes at least one piece of the following information: bits information of a PUSCH, whether a PUSCH carries only control information, a transmission format of a PUCCH, and bits information of PUCCH transmission. The bits information of a PUSCH may include BPRE of the PUSCH and/or size information of a transport block carried in the PUSCH.

Optionally, if at least one piece of information of the channel configuration information is pre-defined or signaling-configuration-based, that is, the pre-defined or signaling-configuration-based channel configuration information is known to the first network device (where the signaling is sent by the first network device to the UE), the UE does not need to send the pre-defined or signaling-configuration-based channel configuration information to the first network device, and the UE only needs to send information that is unknown to the first network device in the channel configuration information (that is, information that is not pre-defined or not signaling-configuration-based in the channel configuration information) to the first network device. Therefore, correspondingly, the first network device only needs to receive the PH sent by the UE and the information that is not pre-defined or not signaling-configuration-based in the channel configuration information.

In this embodiment of the present invention, by putting the PH reported by the UE and the channel configuration information corresponding to the PH correspondingly into the formula in Embodiment 1 of the foregoing power usage state information transmission method, the first network device may obtain more power usage states and more detailed power usage states about the second cell corresponding to the UE, for example, may obtain information about residual power of the UE according to the PH reported by the UE. The first network device may obtain a quantity of RBs of the PUSCH, the scheduling grant manner being dynamic scheduling, transmission format information and a channel sending state of the UE according to the channel configuration information corresponding to the PH, for example: the quantity of RBs of the PUSCH is 2, the scheduling grant manner is dynamic scheduling, that is, j=1, the transmission format information of the UE is, for example, BPRE, and the UE does not send a PUCCH channel. Optionally, according to the foregoing information, a network device that controls a macro cell may obtain $10 \log_{10}(M_{PUSCH,c}(i)) =_{10} \log_{10} 2$ and a value of $P_{O\_PUSCH,c}(1) + \alpha_c(1) \cdot PL_c + \Delta_{TF,c}(i)$ by using the formula (1); and by using the formula (1), the network device may estimate a PH obtained when the quantity of the RBs of the PUSCH is 1, that is, when $10 \log_{10}(M_{PUSCH,c}(i))=0$. Therefore, the network device may estimate a power usage state of a small cell on the UE, so that power needed by a quantity of other RBs of the PUSCH that are scheduled by the small cell can be further estimated.

Further, after the acquiring, by the first network device according to the PH and the channel configuration information, a power usage state of the second cell corresponding to the terminal device, the method further includes: performing, by the first network device, coordinated scheduling on the terminal device according to the power usage state.

Specifically, the performing, by the first network device, coordinated scheduling on the terminal according to the power usage state includes: controlling, by the first network device, scheduling of the second network device for the terminal device according to the power usage state, where the second network device is a network device that controls the second cell; and/or controlling, by the first network device, scheduling of the first network device for the terminal device according to the power usage state.

In this embodiment of the present invention, after the first network device acquires, according to the PH and the channel configuration information corresponding to the PH, the power usage state of the second cell corresponding to the UE, coordinated scheduling on the UE may be further performed, which may include two implementable manners, where in a first implementable manner, the first network device controls scheduling of the second network device for the UE.

Optionally, the controlling, by the first network device, scheduling of the second network device for the terminal device according to the power usage state includes:

calculating, by the first network device according to the power usage state, a scheduling limitation under which the second network device can perform scheduling on the terminal device; and sending, by the first network device, control signaling to the second network device, where the control signaling includes the scheduling limitation.

Figure 5:
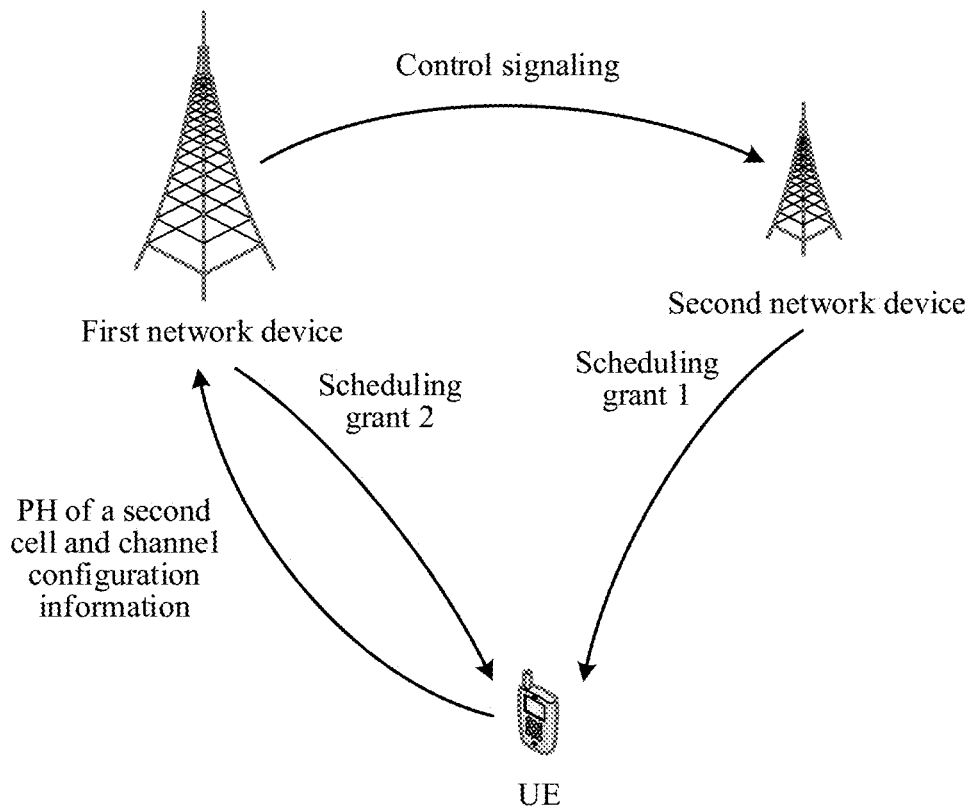
FIG. 5 is a signaling diagram of a power usage state information transmission method.

FIG. 5 is a signaling diagram of a power usage state information transmission method. As shown in FIG. 5, specifically, the first network device may first estimate, by using the formula in Embodiment 1 of the foregoing power usage state information transmission method and according to the PH corresponding to the second cell reported by the UE, the channel configuration information and the power usage state that is obtained through calculation by the first network device, a scheduling state of the second network device such as power needed by the quantity of other RBs of the PUSCH, so as to control a scheduling limitation under which the second network device performs scheduling on the UE, such as a maximum quantity of RBs that enables the second network device to perform scheduling on the UE, and a scheduling moment. Second, the first network device may notify the second network device in a semi-persistent manner, such as sending control signaling to the second network device, where the control signaling may be transmitted by using X2 signaling between eNodeBs corresponding to the first network device and the second network device, and the control signaling includes the scheduling limitation; therefore, uplink scheduling of the second network device for the UE (including a quantity of scheduled RBs and a scheduling moment) is controlled, for example, the second network device may send a scheduling grant 1 to the UE according to the control signaling. Optionally, after the sending, by the first network device, control signaling to the second network device, the method further includes: determining, by the first network device, scheduling of the first network device for the terminal device according to the power usage state and the scheduling limitation. Optionally, the first network device determines, according to the power usage state and the scheduling limitation, that the first network device may send a scheduling grant 2 to the UE according to the scheduling limitation on the UE. Specifically, a process of determining, by the first network device according to the power usage state and the scheduling limitation, scheduling of the first network device for the UE is similar to the foregoing process of estimating, by the first network device according to the PH and the channel configuration information corresponding to the PH, a scheduling state in which the second network device can perform scheduling on the UE, and details are not described herein again in this embodiment.

In a second implementable manner, the first network device controls scheduling of the first network device for the terminal device according to the power usage state.

In this embodiment of the present invention, on a condition of ensuring a power usage state of the second network device, the first network device limits a quantity of RBs of the PUSCH for the first network device to perform scheduling on the UE, and BPRE. For example, by using the foregoing formula and according to residual power of the UE obtained after uplink scheduling of the second network device is satisfied, a quantity of RBs of the PUSCH that can be scheduled by the first network device, the BPRE, and so on may be determined, so that a power usage state, of the UE, in the first network device is controlled. The PH of the second cell corresponding to the UE and the channel configuration information corresponding to the PH are known to the first network device; therefore, the first network device can reserve some power for the second network device in a relatively precise manner, so that the second network device can transmit some data, for example, can at least transmit CQI information that is not periodically fed back. Specifically, details of determining, by the first network device, scheduling that can be performed by the network device for the UE are similar to those in the foregoing process of estimating, by the first network device according to the PH and the channel configuration information corresponding to the PH, a scheduling state in which the second network device can perform scheduling on the UE, and details are not described herein again in this embodiment.

Further, before the receiving, by a first network device, a power headroom PH of a second cell corresponding to a terminal device and channel configuration information corresponding to the PH that are sent by the terminal device, the method further includes:

sending, by the first network device, notification signaling to the terminal device, so that the terminal device sends the PH and the channel configuration information to the first network device.

In this embodiment of the present invention, the first network device may send a piece of notification signaling to the UE, where the notification signaling includes an instruction for instructing the UE to send, to the first network device, the PH of the second cell corresponding to the UE and the channel configuration information, so that the UE determines that the PH of the second cell corresponding to the UE and the channel configuration information corresponding to the PH need to be sent to the first network device, thereby sending the PH and the channel configuration information to the first network device.

In this embodiment of the present invention, a first network device receives a power headroom PH of a second cell corresponding to a terminal device and channel configuration information corresponding to the PH that are sent by the terminal device, and acquires, according to the PH and the channel configuration information, a power usage state of the second cell corresponding to the terminal device, so that the first network device performs coordinated scheduling on UE. In this way, transmit power of the UE between different network devices can be properly allocated, and therefore, resources are properly used.

Figure 6:
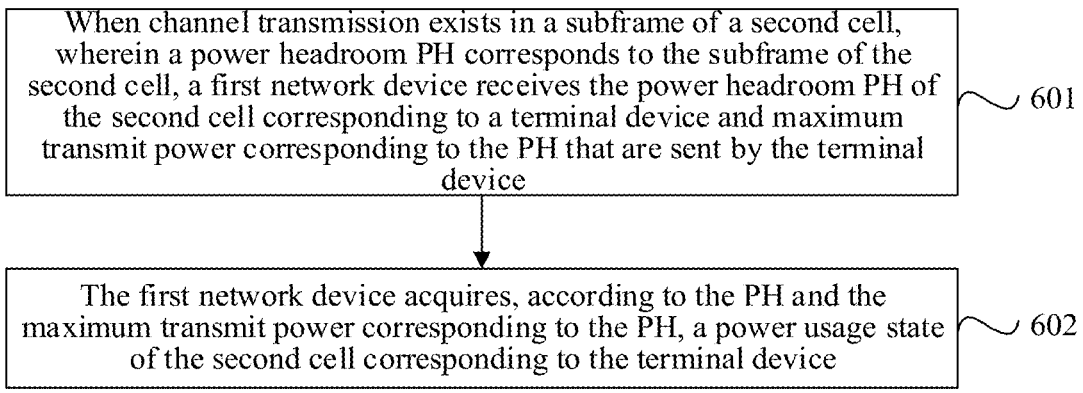
FIG. 6 is a flowchart of Embodiment 4 of a power usage state information transmission method according to the present invention.

FIG. 6 is a flowchart of Embodiment 4 of a power usage state information transmission method according to the present invention. As shown in FIG. 6, the method of this embodiment may include:

Step 601: When channel transmission exists in a subframe of a second cell, wherein a power headroom PH corresponds to the subframe of the second cell, a first network device receives the power headroom PH of the second cell corresponding to a terminal device and maximum transmit power corresponding to the PH that are sent by the terminal device, where the first network device is a network device that controls a first cell.

Step 602: The first network device acquires, according to the PH and the maximum transmit power corresponding to the PH, a power usage state of the second cell corresponding to the terminal device, where the PH is obtained through calculation by the terminal device based on pre-defined channel configuration information or based on channel configuration information configured by a signaling; and the maximum transmit power corresponding to the PH is maximum transmit power configured by the terminal device for the second cell in the subframe of the second cell corresponding to the PH.

This embodiment of the present invention may be performed by the first network device that controls the first cell, and correspondingly, a second network device controls the second cell; or, this embodiment is performed by a first unit of a network device that controls the first cell, correspondingly, a second unit of the network device controls the second cell, and the terminal device in this embodiment may be UE.

In this embodiment of the present invention, when channel transmission exists in a subframe of the second cell, wherein the PH corresponds to the subframe of the second cell, that is, when the terminal device transmits a channel in a subframe of the second cell corresponding to the PH, the first network device receives the power headroom PH, sent by the UE, of the second cell corresponding to the UE and the maximum transmit power corresponding to the PH. The maximum transmit power corresponding to the PH is maximum transmit power configured by the terminal device for the second cell in the subframe of the second cell corresponding to the PH; the PH is a PH obtained through calculation by the UE based on the pre-defined channel configuration information or based on the channel configuration information configured by the signaling. For details of a specific implementation manner, refer to the manner in Embodiment 2 of the foregoing transmission method, and details are not described herein again in this embodiment.

The channel includes at least one of the following channels: a PUSCH and a PUCCH. The channel configuration information may include at least one piece of the following information: a quantity of resource blocks RBs, a scheduling grant manner, transmission format information, and channel sending state information, and may also include other configuration information, such as a closed-loop power control adjustment value $f_c(i)$, which is not limited herein in the present invention. Optionally, the channel sending state may include whether to send a PUSCH and/or PUCCH. The scheduling grant manner includes at least one of the following manners: a semi-persistent scheduling grant, a dynamic scheduling grant, and a random access response grant, and the scheduling grant manner is denoted by using a value of a variable j, where j is 0, 1, or 2. The transmission format information includes at least one piece of the following information: bits information of a PUSCH, whether a PUSCH carries only control information, a transmission format of a PUCCH, and bits information of PUCCH transmission. The bits information of a PUSCH may include BPRE of the PUSCH and/or size information of a transport block carried in the PUSCH.

In this embodiment of the present invention, by putting the PH reported by the UE and the maximum transmit power corresponding to the PH correspondingly into the formula in Embodiment 1 of the foregoing transmission method, the first network device may obtain more power usage states and more detailed power usage states about the second cell corresponding to the UE. Optionally, if based on the channel configuration information (pre-definition-based or signaling-configuration-based, that is, channel configuration information known to the first network device) in Embodiment 2, the first network device may also put the PH reported by the UE and the maximum transmit power corresponding to the PH into the formula (8) in Embodiment 2 to obtain more power usage state information about the second cell corresponding to the UE. For example, the pre-defined or signaling-configured channel configuration information may be information such as a quantity of RBs of the PUSCH, the scheduling grant manner being dynamic scheduling, transmission format information and a channel sending state of the UE, for example: the quantity of RBs of the PUSCH is 2, the scheduling grant manner is dynamic scheduling, that is, j=1, the transmission format information of the UE is, for example, BPRE, and the UE does not send a PUCCH channel. Optionally, the first network device obtains, according to the PH reported by the UE and the corresponding maximum transmit power and by putting the foregoing information into the formula (1), $10 \log_{10} (M_{PUSCH,c}(i))=10 \log_{10} 2$ and a value of $P_{O\_PUSCH,c}(1)+\alpha_c(1) \cdot PL_c+\Delta_{TF,c}(i)$; and by using the formula (1), the network device that controls a macro cell may estimate a PH obtained when the quantity of the RBs of the PUSCH is 1, that is, when $10 \log_{10} (M_{PUSCH,c}(i))=0$. Therefore, the network device may acquire a power usage state of a small cell on the UE.

Further, after the acquiring, by the first network device according to the PH and the maximum transmit power, a power usage state of the second cell corresponding to the terminal device, the method further includes: performing, by the first network device, coordinated scheduling on the terminal device according to the power usage state.

Specifically, the performing, by the first network device, coordinated scheduling on the terminal according to the power usage state includes: controlling, by the first network device, scheduling of the second network device for the terminal device according to the power usage state, where the second network device is a network device that controls the second cell; and/or controlling, by the first network device, scheduling of the first network device for the terminal device according to the power usage state.

Optionally, the controlling, by the first network device, scheduling of the second network device for the terminal device according to the power usage state includes: calculating, by the first network device according to the power usage state, a scheduling limitation under which the second network device can perform scheduling on the terminal device; and sending, by the first network device, control signaling to the second network device, where the control signaling includes the scheduling limitation.

Optionally, after the sending, by the first network device, control signaling to the second network device, the method further includes: determining, by the first network device, scheduling of the first network device for the terminal device according to the power usage state and the scheduling limitation.

The controlling, by the first network device, scheduling of the first network device for the terminal device according to the power usage state includes: determining, by the first network device, scheduling of the first network device for the terminal device according to the power usage state.

In this embodiment of the present invention, specifically, for details of the performing, by the first network device, coordinated scheduling on the terminal device according to the power usage state, refer to the coordination manner in Embodiment 3 of the foregoing transmission method, and details are not described herein again in this embodiment.

Further, before the receiving, by a first network device, the power headroom PH of the second network device corresponding to a terminal device and maximum transmit power corresponding to the PH that are sent by the terminal device, the method further includes: sending, by the first network device, notification signaling to the terminal device, so that the terminal device sends, to the first network device, the PH and the maximum transmit power corresponding to the PH.

In this embodiment of the present invention, the first network device may send a piece of notification signaling to the UE, where the notification signaling includes an instruction for instructing the UE to send, to the first network device, the PH of the second cell corresponding to the UE and the corresponding maximum transmit power, so that the UE determines that the PH of the second cell corresponding to the UE and the corresponding maximum transmit power need to be sent to the first network device, thereby sending the PH and the corresponding maximum transmit power to the first network device.

Further, before the receiving, by a first network device, the power headroom PH of the second cell corresponding to a terminal device and maximum transmit power corresponding to the PH that are sent by the terminal device, the method further includes: sending, by the first network device, the signaling to the terminal device, where the signaling includes the channel configuration information.

In this embodiment of the present invention, the first network device may send a piece of signaling to the UE, where the signaling is used for sending channel configuration information to the UE, where the signaling includes the channel configuration information.

In this embodiment of the present invention, when channel transmission exists in a subframe of a second cell, wherein a power headroom PH corresponds to the subframe of the second cell, a first network device receives the power headroom PH of the second cell corresponding to a terminal device and maximum transmit power corresponding to the PH that are sent by the terminal device, and acquires, according to the PH and the maximum transmit power corresponding to the PH, a power usage state of the second cell corresponding to the terminal device, so that the first network device performs coordinated scheduling on UE. In this way, transmit power of the UE between different network devices can be properly allocated, and therefore, resources are properly used.

Figure 7:
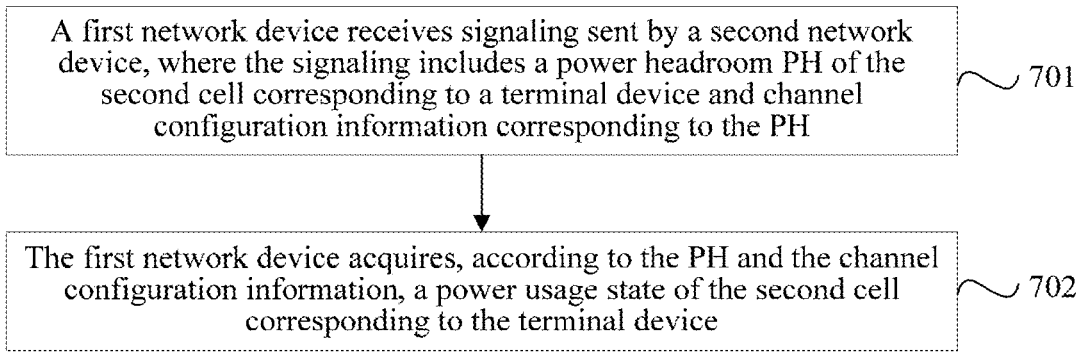
FIG. 7 is a flowchart of Embodiment 5 of a power usage state information transmission method according to the present invention.

FIG. 7 is a flowchart of Embodiment 5 of a power usage state information transmission method according to the present invention. As shown in FIG. 7, the method of this embodiment may include:

Step 701: A first network device receives signaling sent by a second network device, where the first network device is a network device that controls a first cell; the second network device is a network device that controls a second cell; and the signaling includes a power headroom PH of the second cell corresponding to a terminal device and channel configuration information corresponding to the PH.

Step 702: The first network device acquires, according to the PH and the channel configuration information, a power usage state of the second cell corresponding to the terminal device.

This embodiment of the present invention may be performed by the first network device that controls the first cell, and correspondingly, the second network device controls the second cell; or, this embodiment is performed by a first unit of a network device that controls the first cell, correspondingly, a second unit of the network device controls the second cell, and the terminal device in this embodiment may be UE.

In this embodiment of the present invention, different from Embodiment 3 of the foregoing power usage state information transmission method, in this embodiment, there is an interface for transferring signaling between base stations, such as an X2 interface. Therefore, the first network device may receive, directly by using the interface, signaling sent by the second network device, and the signaling includes a power headroom PH of the second network device corresponding to the UE and channel configuration information corresponding to the PH, where the PH is calculated by the UE and reported to the second network device. Specifically, for details of a manner in which the UE calculates the PH, refer to Embodiment 1 of the foregoing power usage state information transmission method, and details are not described herein again in this embodiment. In addition, the channel configuration information corresponding to the PH is known to the second network device, and does not need to be reported by the UE to the second network device. Specifically, the channel includes at least one of the following channels: a PUSCH and a PUCCH. The channel configuration information may include at least one piece of the following information: a quantity of resource blocks RBs, a scheduling grant manner, transmission format information, and channel sending state information, and may also include other configuration information, such as a closed-loop power control adjustment value $f_c(i)$, which is not limited herein in the present invention. Optionally, the channel sending state may include whether to send a PUSCH and/or PUCCH. The scheduling grant manner includes at least one of the following manners: a semi-persistent scheduling grant, a dynamic scheduling grant, and a random access response grant, and the scheduling grant manner is denoted by using a value of a variable j, where j is 0, 1, or 2. The transmission format information includes at least one piece of the following information: bits information of a PUSCH, whether a PUSCH carries only control information, a transmission format of a PUCCH, and bits information of PUCCH transmission. The bits information of a PUSCH may include BPRE of the PUSCH and/or size information of a transport block carried in the PUSCH.

In this embodiment of the present invention, specifically, the manner in which the first network device acquires, according to the PH and the channel configuration information, a power usage state of the second cell corresponding to the terminal device is the same as the manner in Embodiment 3 of the foregoing usage state information transmission method. Refer to Embodiment 3 for details, and details are not described herein again in this embodiment.

Further, after the acquiring, by the first network device according to the PH and the channel configuration information, a power usage state of the second cell corresponding to the terminal device, the method further includes: performing, by the first network device, coordinated scheduling on the terminal according to the power usage state.

Specifically, the performing, by the first network device, coordinated scheduling on the terminal device according to the power usage state includes: controlling, by the first network device, scheduling of the second network device for the terminal device according to the power usage state, where the second network device is a network device that controls the second cell; and/or controlling, by the first network device, scheduling of the first network device for the terminal device according to the power usage state.

Optionally, the controlling, by the first network device, scheduling of the second network device for the terminal device according to the power usage state includes:

calculating, by the first network device according to the power usage state, a scheduling limitation under which the second network device can perform scheduling on the terminal device; and sending, by the first network device, control signaling to the second network device, where the control signaling includes the scheduling limitation.

Optionally, after the sending, by the first network device, control signaling to the second network device, the method further includes: determining, by the first network device, scheduling of the first network device for the terminal device according to the power usage state and the scheduling limitation.

Optionally, the controlling, by the first network device, scheduling of the first network device for the terminal device according to the power usage state includes: determining, by the first network device, scheduling of the first network device for the terminal device according to the power usage state.

In this embodiment, specifically, for the manner in which the first network device performs coordinated scheduling on the terminal device according to the power usage state, refer to the manner in Embodiment 3 of the foregoing transmission method, and details are not described herein again in this embodiment.

Further, before the receiving, by a first network device, signaling sent by a second network device, the method further includes: sending, by the first network device, notification signaling to the second network device, so that the second network device sends, to the first network device, the signaling that includes the power headroom PH of the second cell corresponding to the terminal device and the channel configuration information corresponding to the PH.

In this embodiment of the present invention, a first network device receives signaling sent by a second network device, where the signaling includes a power headroom PH of a second cell corresponding to a terminal device and channel configuration information corresponding to the PH, and acquires, according to the PH and the channel configuration information, a power usage state of the second cell corresponding to the terminal device, so that the first network device performs coordinated scheduling on UE. In this way, transmit power of the UE between different network devices can be properly allocated, and therefore, resources are properly used.

Figure 8:
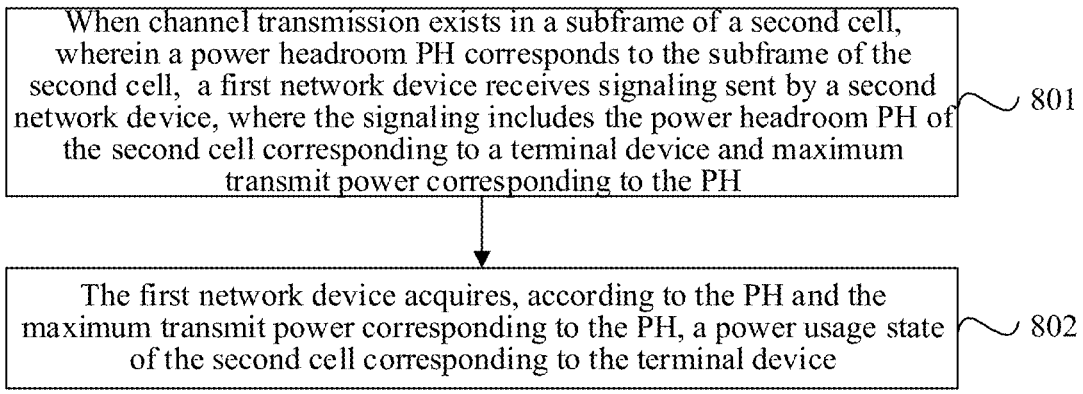
FIG. 8 is a flowchart of Embodiment 6 of a power usage state information transmission method according to the present invention.

FIG. 8 is a flowchart of Embodiment 6 of a power usage state information transmission method according to the present invention. As shown in FIG. 8, the method of this embodiment may include:

Step 801: When channel transmission exists in a subframe of a second cell, wherein a power headroom PH corresponds to the subframe of the second cell, a first network device receives signaling sent by a second network device, where the first network device is a network device that controls a first cell; the second network device is a network device that controls a second cell; and the signaling includes the power headroom PH of the second cell corresponding to a terminal device and maximum transmit power corresponding to the PH.

Step 802: The first network device acquires, according to the PH and the maximum transmit power corresponding to the PH, a power usage state of the second cell corresponding to the terminal device, where the PH is obtained through calculation by the terminal device based on pre-defined channel configuration information or based on channel configuration information configured by a signaling; and the maximum transmit power corresponding to the PH is maximum transmit power configured by the terminal device for the second cell in the subframe of the second cell corresponding to the PH.

This embodiment of the present invention may be performed by the first network device that controls the first cell, and correspondingly, the second network device controls the second cell; or, this embodiment is performed by a first unit of a network device that controls the first cell, correspondingly, a second unit of the network device controls the second cell, and the terminal device in this embodiment may be UE.

In this embodiment of the present invention, different from Embodiment 3 of the foregoing power usage state information transmission method, in this embodiment, there is an interface for transferring signaling between base stations, such as an X2 interface. Therefore, when channel transmission exists in a subframe of the second cell, wherein the PH corresponds to the subframe of the second cell, the first network device may receive, directly by using the interface, signaling sent by the second network device, and the signaling includes a power headroom PH of the second cell corresponding to the terminal device and maximum transmit power corresponding to the PH, where the maximum transmit power corresponding to the PH is maximum transmit power configured by the terminal device for the second cell in the subframe of the second cell corresponding to the PH and may be reported by the UE to the second network device; and the PH is calculated by the UE and reported to the second network device. Specifically, for details of a manner in which the UE calculates the PH, refer to Embodiment 2 of the foregoing transmission method, and details are not described herein again in this embodiment. Specifically, the channel includes at least one of the following channels: a PUSCH and a PUCCH. The channel configuration information may include at least one piece of the following information: a quantity of resource blocks RBs, a scheduling grant manner, transmission format information, and channel sending state information, and may also include other configuration information, such as a closed-loop power control adjustment value $f_c(i)$, which is not limited herein in the present invention. Optionally, the channel sending state may include whether to send a PUSCH and/or PUCCH. The scheduling grant manner includes at least one of the following manners: a semi-persistent scheduling grant, a dynamic scheduling grant, and a random access response grant, and the scheduling grant manner is denoted by using a value of a variable j, where j is 0, 1, or 2. The transmission format information includes at least one piece of the following information: bits information of a PUSCH, whether a PUSCH carries only control information, a transmission format of a PUCCH, and bits information of PUCCH transmission. The bits information of a PUSCH may include BPRE of the PUSCH and/or size information of a transport block carried in the PUSCH.

In this embodiment of the present invention, specifically, for details of the manner in which the first network device acquires, according to the PH and the maximum transmit power corresponding to the PH, a power usage state of the second cell corresponding to the terminal device, refer to the manner in Embodiment 4 of the foregoing transmission method, and details are not described herein again in this embodiment.

Further, after the acquiring, by the first network device according to the PH and the maximum transmit power corresponding to the PH, a power usage state of the second cell corresponding to the terminal device, the method further includes: performing, by the first network device, coordinated scheduling on the terminal according to the power usage state.

Specifically, the performing, by the first network device, coordinated scheduling on the terminal device according to the power usage state includes: controlling, by the first network device, scheduling of the second network device for the terminal device according to the power usage state, where the second network device is a network device that controls the second cell; and/or controlling, by the first network device, scheduling of the first network device for the terminal device according to the power usage state.

Optionally, the controlling, by the first network device, scheduling of the second network device for the terminal device according to the power usage state includes: calculating, by the first network device according to the power usage state, a scheduling limitation under which the second network device can perform scheduling on the terminal device; and sending, by the first network device, control signaling to the second network device, where the control signaling includes the scheduling limitation.

Optionally, after the sending, by the first network device, control signaling to the second network device, the method further includes: determining, by the first network device, scheduling of the first network device for the terminal device according to the power usage state and the scheduling limitation.

Optionally, the controlling, by the first network device, scheduling of the first network device for the terminal device according to the power usage state includes: determining, by the first network device, scheduling of the first network device for the terminal device according to the power usage state.

In this embodiment, specifically, for the manner in which the first network device performs coordinated scheduling on the terminal according to the power usage state, refer to the manner in Embodiment 4 of the foregoing transmission method, and details are not described herein again in this embodiment.

Further, before the receiving, by a first network device, signaling sent by a second network device, the method further includes: sending, by the first network device, notification signaling to the second network device, so that the second network device sends, to the first network device, the signaling that includes the PH and the maximum transmit power corresponding to the PH.

In this embodiment of the present invention, when channel transmission exists in a subframe of a second cell, wherein a power headroom PH corresponds to the subframe of the second cell, a first network device receives signaling sent by a second network device, where the signaling includes the power headroom PH of the second cell corresponding to a terminal device and maximum transmit power corresponding to the PH, and acquires, according to the PH and the maximum transmit power corresponding to the PH, a power usage state of the second cell corresponding to the terminal device, so that the first network device performs coordinated scheduling on UE. In this way, transmit power of the UE between different network devices can be properly allocated, and therefore, resources are properly used.

Figure 9:
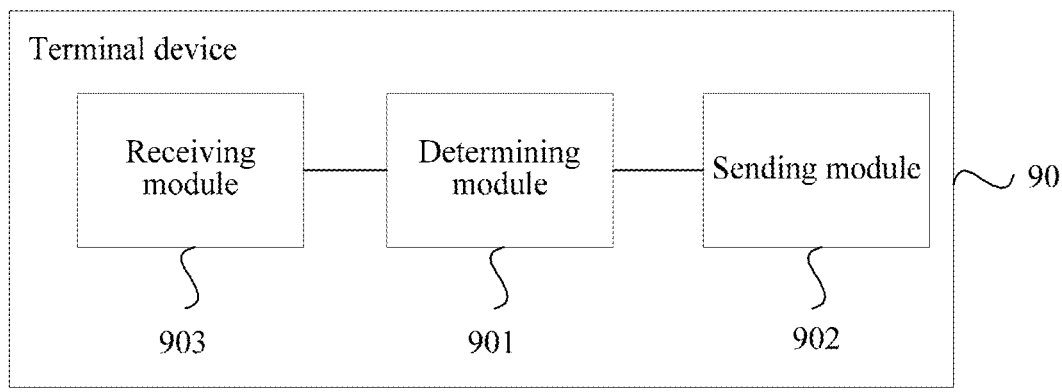
FIG. 9 is a schematic structural diagram of Embodiment 1 of a terminal device according to the present invention.

FIG. 9 is a schematic structural diagram of Embodiment 1 of a terminal device according to the present invention. As shown in FIG. 9, a terminal device 90 provided in this embodiment includes: a determining module 901 and a sending module 902.

The determining module 901 is configured to determine a power headroom PH of a second cell corresponding to the terminal device; and the sending module 902 is configured to send, to the first network device, the PH and channel configuration information corresponding to the PH, where the first network device is a network device that controls a first cell.

Optionally, the channel includes at least one of the following channels: a physical uplink shared channel PUSCH and a physical uplink control channel PUCCH.

Optionally, the channel configuration information includes at least one piece of the following information:

a quantity of resource blocks RBs, a scheduling grant manner, transmission format information, and channel sending state information.

Optionally, the scheduling grant manner includes at least one of the following manners:

a semi-persistent scheduling grant, a dynamic scheduling grant, and a random access response grant.

Optionally, the transmission format information includes at least one piece of the following information:

bits information of a PUSCH, whether a PUSCH carries only control information, a transmission format of a PUCCH, and bits information of PUCCH transmission.

Optionally, the device further includes:

a receiving module 903, configured to receive notification signaling sent by the first network device, where the notification signaling is used for instructing the terminal device to send, to the first network device, the PH of the second cell corresponding to the terminal device and channel parameter configuration information corresponding to the PH.

The terminal device of this embodiment may be used for the technical solution of Embodiment 1 of the power control method, an implementation principle and a technical effect of this embodiment are similar to those of Embodiment 1, and details are not described herein again.

Figure 10:
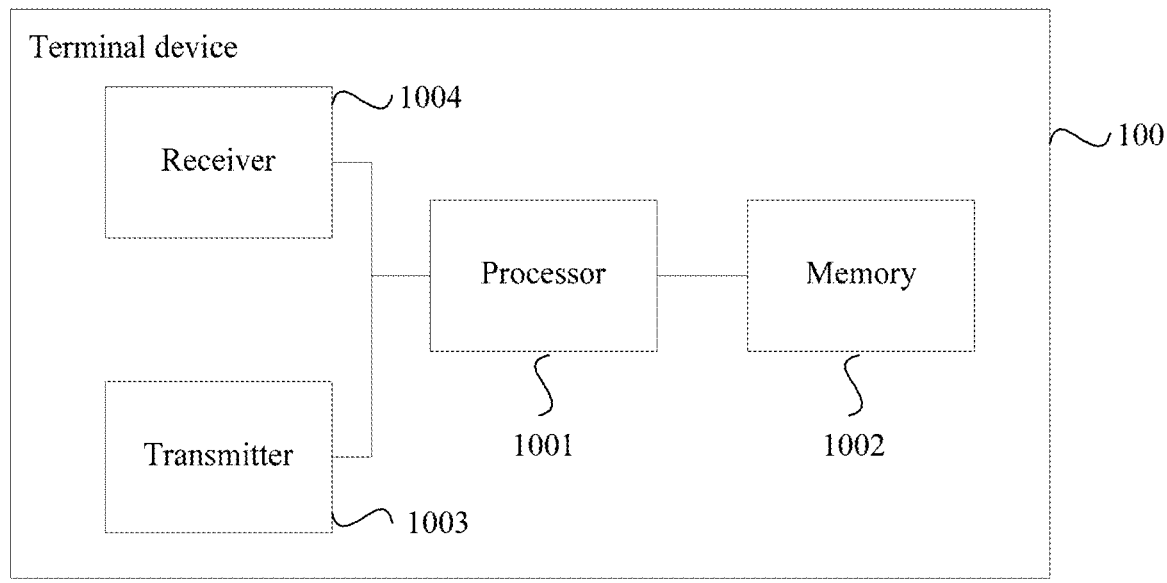
FIG. 10 is a schematic structural diagram of Embodiment 2 of a terminal device according to the present invention.

FIG. 10 is a schematic structural diagram of Embodiment 2 of a terminal device according to the present invention. As shown in FIG. 10, a terminal device 100 provided in this embodiment includes: a processor 1001 and a memory 1002. The terminal device 100 may further include a transmitter 1003 and a receiver 1004. The transmitter 1003 and the receiver 1004 may be connected to the processor 1001. The transmitter 1003 is configured to send data or information, the receiver 1004 is configured to receive data or information, and the memory 1002 is configured to store an execution instruction. When the terminal device 100 runs, the processor 1001 and the memory 1002 communicate with each other, and the processor 1001 invokes the execution instruction in the memory and is configured to perform operations in Embodiment 1 of the foregoing power control method.

The terminal device of this embodiment may be configured to perform the technical solution of Embodiment 1 of the power control method of the present invention, an implementation principle and a technical effect of this embodiment are similar to those of Embodiment 1, and details are not described herein again.

Figure 11:
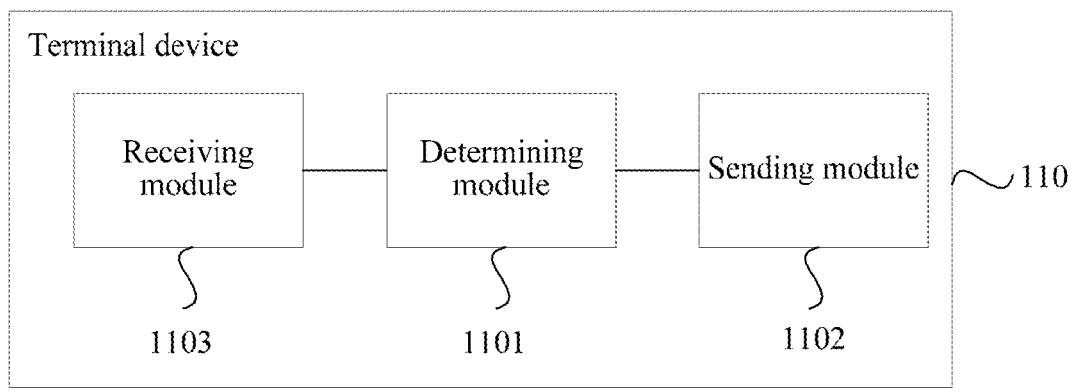
FIG. 11 is a schematic structural diagram of Embodiment 3 of a terminal device according to the present invention.

FIG. 11 is a schematic structural diagram of Embodiment 3 of a terminal device according to the present invention. As shown in FIG. 11, a terminal device 110 provided in this embodiment includes: a determining module 1101 and a sending module 1102.

The determining module 1101 is configured to: when channel transmission exists in a subframe of a second cell, wherein a power headroom PH corresponds to the subframe of the second cell, determine the PH of the second cell corresponding to the terminal device; and the sending module 1102 is configured to send, to the first network device, the PH and maximum transmit power corresponding to the PH, where the first network device is a network device that controls a first cell; the PH is obtained through calculation by the terminal device based on predefined channel configuration information or based on channel configuration information configured by a signaling; and the maximum transmit power corresponding to the PH is maximum transmit power configured by the terminal device for the second cell in the subframe of the second cell corresponding to the PH.

Optionally, the channel includes at least one of the following channels: a physical uplink shared channel PUSCH and a physical uplink control channel PUCCH.

Optionally, the channel configuration information includes at least one piece of the following information: a quantity of resource blocks RBs, a scheduling grant manner, transmission format information, and channel sending state information.

Optionally, the scheduling grant manner includes at least one of the following manners: a semi-persistent scheduling grant, a dynamic scheduling grant, and a random access response grant.

Optionally, the transmission format information includes at least one piece of the following information: bits information of a PUSCH, whether a PUSCH carries only control information, a transmission format of a PUCCH, and bits information of PUCCH transmission.

Optionally, the device further includes:

a receiving module 1103, configured to receive notification signaling sent by the first network device, where the notification signaling is used for instructing the terminal device to send, to the first network device, the PH of the second cell corresponding to the terminal device and the maximum transmit power corresponding to the PH.

Optionally, the receiving module is further configured to receive the signaling, where the signaling includes the channel configuration information.

The terminal device of this embodiment may be used for the technical solution of Embodiment 2 of the power control method, an implementation principle and a technical effect of this embodiment are similar to those of Embodiment 2, and details are not described herein again.

Figure 12:
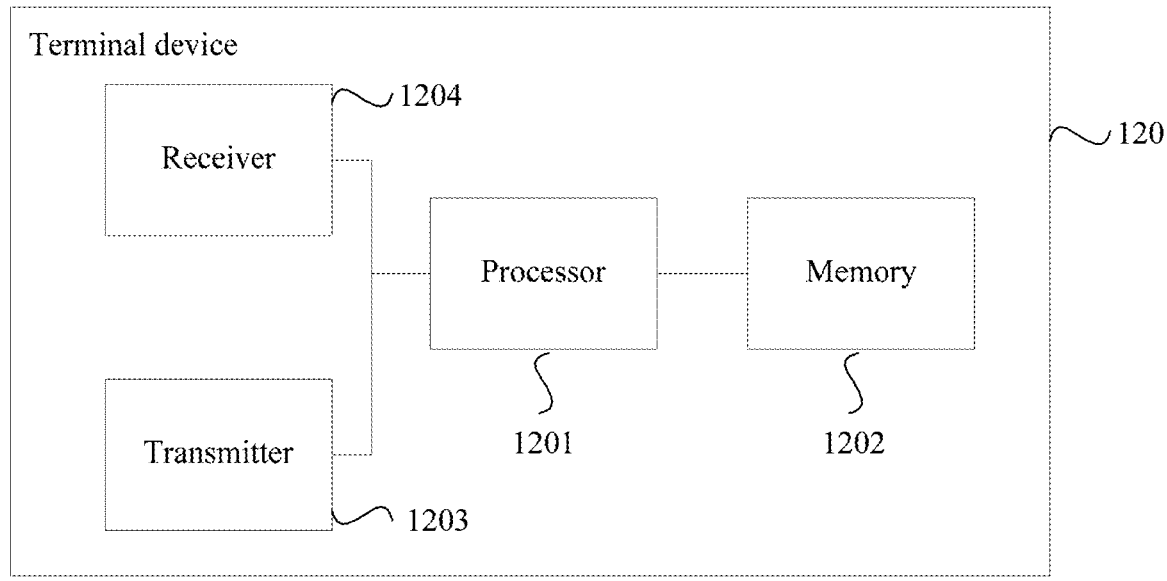
FIG. 12 is a schematic structural diagram of Embodiment 4 of a terminal device according to the present invention.

FIG. 12 is a schematic structural diagram of Embodiment 4 of a terminal device according to the present invention. As shown in FIG. 12, a terminal device 120 provided in this embodiment includes: a processor 1201 and a memory 1202. The terminal device 120 may further include a transmitter 1203 and a receiver 1204. The transmitter 1203 and the receiver 1204 may be connected to the processor 1201. The transmitter 1203 is configured to send data or information, the receiver 1204 is configured to receive data or information, and the memory 1202 is configured to store an execution instruction. When the terminal device 120 runs, the processor 1201 and the memory 1202 communicate with each other, and the processor 1201 invokes the execution instruction in the memory and is configured to perform operations in Embodiment 2 of the foregoing power control method.

The terminal device of this embodiment may be configured to perform the technical solution of Embodiment 2 of the power control method of the present invention, an implementation principle and a technical effect of this embodiment are similar to those of Embodiment 2, and details are not described herein again.

Figure 13:
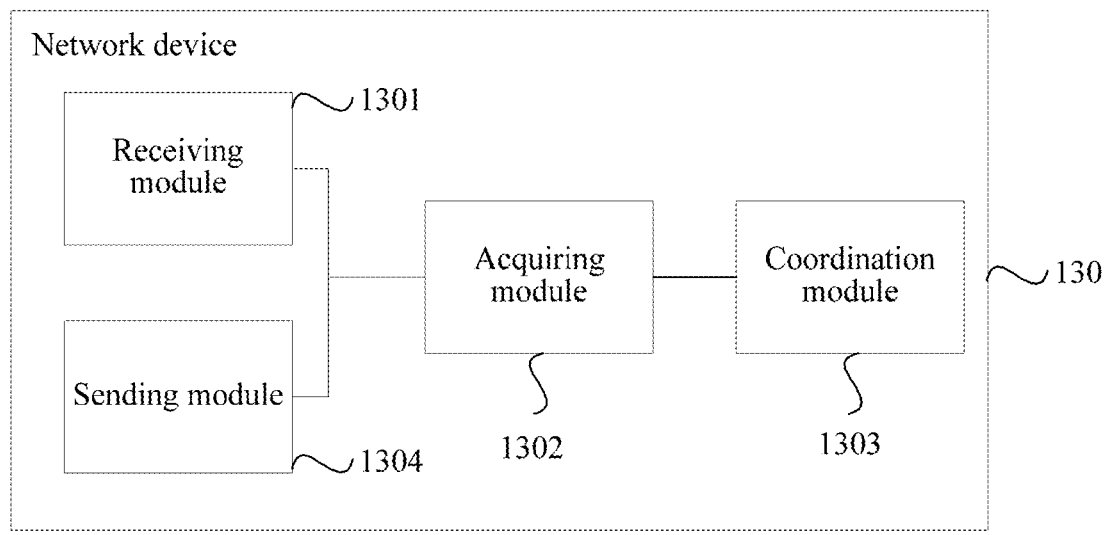
FIG. 13 is a schematic structural diagram of Embodiment 1 of a network device according to the present invention.

FIG. 13 is a schematic structural diagram of Embodiment 1 of a network device according to the present invention. As shown in FIG. 13, a network device 130 provided in this embodiment includes: a receiving module 1301 and an acquiring module 1302.

The receiving module 1301 is configured to receive a power headroom PH of a second cell corresponding to a terminal device and channel configuration information corresponding to the PH that are sent by the terminal device; and the acquiring module 1302 is configured to acquire, according to the PH and the channel configuration information, a power usage state of the second cell corresponding to the terminal device.

Optionally, the channel includes at least one of the following channels: a physical uplink shared channel PUSCH and a physical uplink control channel PUCCH.

Optionally, the channel configuration information includes at least one piece of the following information: a quantity of resource blocks RBs, a scheduling grant manner, transmission format information, and channel sending state information.

Optionally, the scheduling grant manner includes at least one of the following manners: a semi-persistent scheduling grant, a dynamic scheduling grant, and a random access response grant.

Optionally, the transmission format information includes at least one piece of the following information: bits information of a PUSCH, whether a PUSCH carries only control information, a transmission format of a PUCCH, and bits information of PUCCH transmission.

Optionally, the device further includes:

a coordination module 1303, configured to perform coordinated scheduling on the terminal device according to the power usage state.

Optionally, the coordination module includes:

a first control unit, configured to control scheduling of the second network device for the terminal device according to the power usage state, where the second network device is a network device that controls the second cell; and/or a second control unit, configured to control scheduling of the first network device for the terminal device according to the power usage state.

Optionally, the first control unit is specifically configured to: calculate, according to the power usage state, a scheduling limitation under which the second network device can perform scheduling on the terminal device; and send control signaling to the second network device, where the control signaling includes the scheduling limitation.

Optionally, the first control unit is further specifically configured to determine scheduling of the first network device for the terminal device according to the power usage state and the scheduling limitation.

Optionally, the second control unit is specifically configured to determine scheduling of the first network device for the terminal device according to the power usage state.

Optionally, the device further includes:

a sending module 1304, configured to send notification signaling to the terminal device, so that the terminal device sends the PH and the channel configuration information to the first network device.

The network device of this embodiment may be used for the technical solution of Embodiment 3 of the power control method, an implementation principle and a technical effect of this embodiment are similar to those of Embodiment 3, and details are not described herein again.

Figure 14:
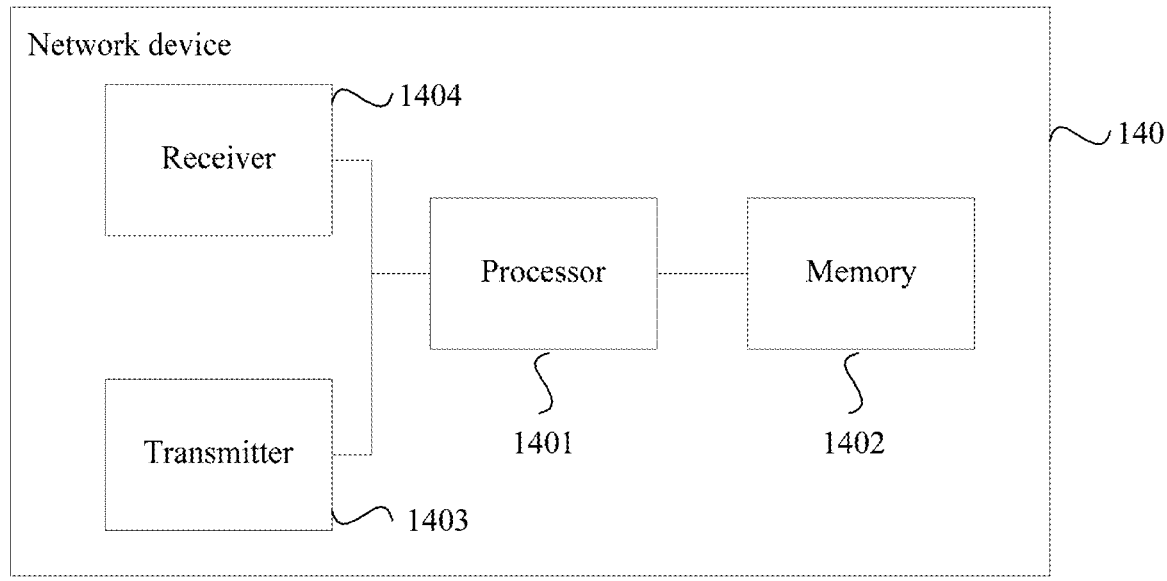
FIG. 14 is a schematic structural diagram of Embodiment 2 of a network device according to the present invention.

FIG. 14 is a schematic structural diagram of Embodiment 2 of a network device according to the present invention. As shown in FIG. 14, a network device 140 provided in this embodiment includes: a processor 1401 and a memory 1402. The network device 140 may further include a transmitter 1403 and a receiver 1404. The transmitter 1403 and the receiver 1404 may be connected to the processor 1401. The transmitter 1403 is configured to send data or information, the receiver 1404 is configured to receive data or information, and the memory 1402 is configured to store an execution instruction. When the network device 140 runs, the processor 1401 and the memory 1402 communicate with each other, and the processor 1401 invokes the execution instruction in the memory 1402 and is configured to perform operations in Embodiment 3 of the foregoing power control method.

The network device of this embodiment may be configured to perform the technical solution of Embodiment 3 of the power control method of the present invention, an implementation principle and a technical effect of this embodiment are similar to those of Embodiment 3, and details are not described herein again.

Figure 15:
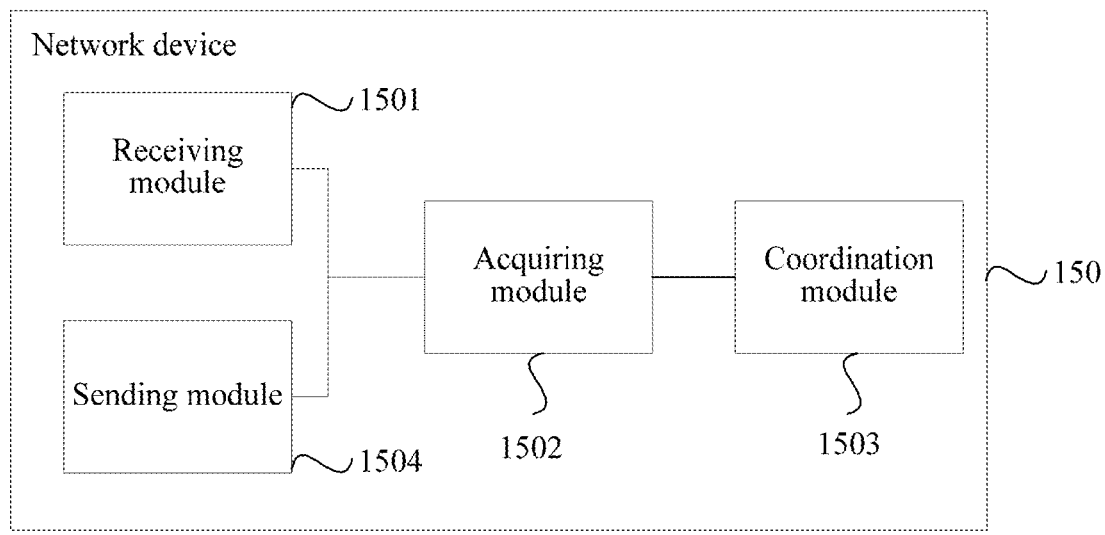
FIG. 15 is a schematic structural diagram of Embodiment 3 of a network device according to the present invention.

FIG. 15 is a schematic structural diagram of Embodiment 3 of a network device according to the present invention. As shown in FIG. 15, a network device 150 provided in this embodiment includes: a receiving module 1501 and an acquiring module 1502.

The receiving module 1501 is configured to: when channel transmission exists in a subframe of a second cell, wherein a power headroom PH corresponds to the subframe of the second cell, receive the PH of the second cell corresponding to a terminal device and maximum transmit power corresponding to the PH that are sent by the terminal device; and the acquiring module 1502 is configured to acquire, according to the PH and the maximum transmit power, a power usage state of the second cell corresponding to the terminal device, where the PH is obtained through calculation by the terminal device based on pre-defined channel configuration information or based on channel configuration information configured by a signaling; and the maximum transmit power corresponding to the PH is maximum transmit power configured by the terminal device for the second cell in the subframe of the second cell corresponding to the PH.

Optionally, the channel includes at least one of the following channels: a physical uplink shared channel PUSCH and a physical uplink control channel PUCCH.

Optionally, the channel configuration information includes at least one piece of the following information: a quantity of resource blocks RBs, a scheduling grant manner, transmission format information, and channel sending state information.

Optionally, the scheduling grant manner includes at least one of the following manners: a semi-persistent scheduling grant, a dynamic scheduling grant, and a random access response grant.

Optionally, the transmission format information includes at least one piece of the following information: bits information of a PUSCH, whether a PUSCH carries only control information, a transmission format of a PUCCH, and bits information of PUCCH transmission.

Optionally, the device further includes:

a coordination module 1503, configured to perform coordinated scheduling on the terminal device according to the power usage state.

Optionally, the coordination module 1503 includes:

a first control unit, configured to control scheduling of a second network device for the terminal device according to the power usage state, where the second network device is a network device that controls the second cell; and/or a second control unit, configured to control scheduling of the first network device for the terminal device according to the power usage state.

Optionally, the first control unit is specifically configured to: calculate, according to the power usage state, a scheduling limitation under which the second network device can perform scheduling on the terminal device; and send control signaling to the second network device, where the control signaling includes the scheduling limitation.

Optionally, the first control unit is further specifically configured to determine scheduling of the first network device for the terminal device according to the power usage state and the scheduling limitation.

Optionally, the second control unit is specifically configured to determine scheduling of the first network device for the terminal device according to the power usage state.

Optionally, the device further includes:

a sending module 1504, configured to send notification signaling to the terminal device, so that the terminal device sends, to the first network device, the PH and the maximum transmit power corresponding to the PH.

Optionally, the sending module 1504 is further configured to send the signaling to the terminal device, where the signaling includes the channel configuration information.

The network device of this embodiment may be used for the technical solution of Embodiment 4 of the power control method, an implementation principle and a technical effect of this embodiment are similar to those of Embodiment 4, and details are not described herein again.

Figure 16:
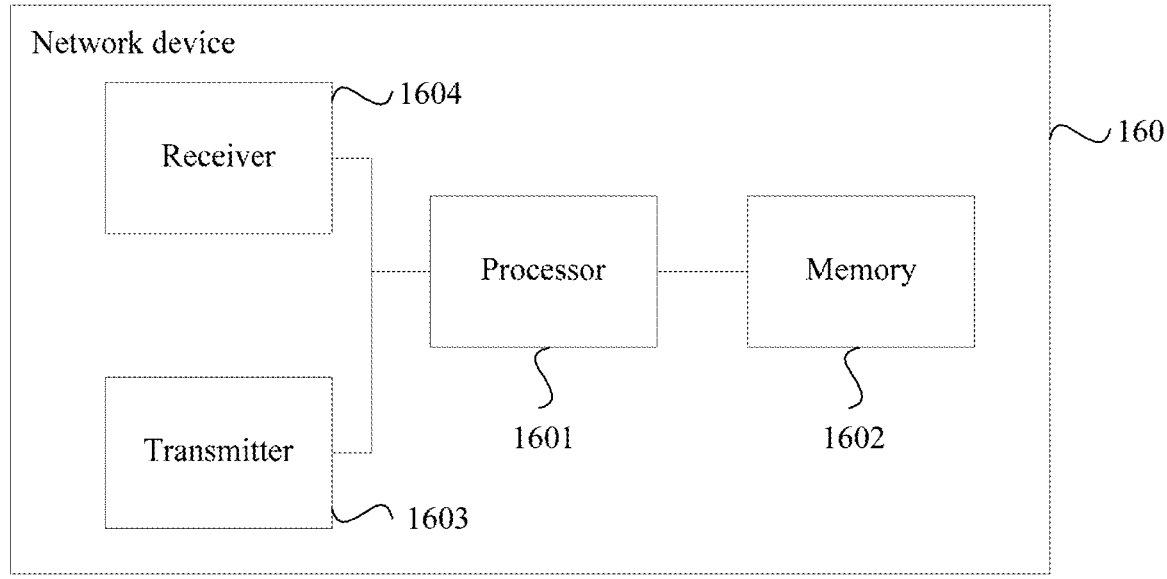
FIG. 16 is a schematic structural diagram of Embodiment 4 of a network device according to the present invention.

FIG. 16 is a schematic structural diagram of Embodiment 4 of a network device according to the present invention. As shown in FIG. 16, a network device 160 provided in this embodiment includes: a processor 1601 and a memory 1602. The network device 160 may further include a transmitter 1603 and a receiver 1604. The transmitter 1603 and the receiver 1604 may be connected to the processor 1601. The transmitter 1603 is configured to send data or information, the receiver 1604 is configured to receive data or information, and the memory 1602 is configured to store an execution instruction. When the network device 160 runs, the processor 1601 and the memory 1602 communicate with each other, and the processor 1601 invokes the execution instruction in the memory 1602 and is configured to perform operations in Embodiment 4 of the foregoing power control method.

The network device of this embodiment may be configured to perform the technical solution of Embodiment 4 of the power control method of the present invention, an implementation principle and a technical effect of this embodiment are similar to those of Embodiment 4, and details are not described herein again.

Figure 17:
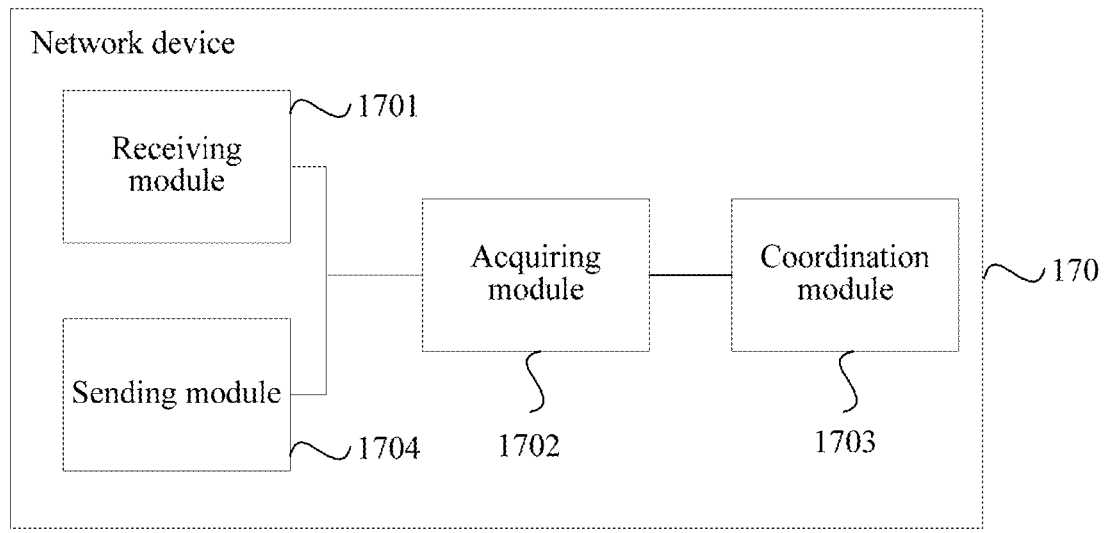
FIG. 17 is a schematic structural diagram of Embodiment 5 of a network device according to the present invention.

FIG. 17 is a schematic structural diagram of Embodiment 5 of a network device according to the present invention. As shown in FIG. 17, a network device 170 provided in this embodiment includes: a receiving module 1701 and an acquiring module 1702.

The receiving module 1701 is configured to receive signaling sent by a second network device, where the second network device is a network device that controls a second cell; and the signaling includes a power headroom PH of the second cell corresponding to a terminal device and channel configuration information corresponding to the PH; and the acquiring module 1702 is configured to acquire, according to the PH and the channel configuration information, a power usage state of the second cell corresponding to the terminal device.

Optionally, the channel includes at least one of the following channels: a physical uplink shared channel PUSCH and a physical uplink control channel PUCCH.

Optionally, the channel configuration information includes at least one piece of the following information: a quantity of resource blocks RBs, a scheduling grant manner, transmission format information, and channel sending state information.

Optionally, the scheduling grant manner includes at least one of the following manners:

a semi-persistent scheduling grant, a dynamic scheduling grant, and a random access response grant.

Optionally, the transmission format information includes at least one piece of the following information:

bits information of a PUSCH, whether a PUSCH carries only control information, a transmission format of a PUCCH, and bits information of PUCCH transmission.

Optionally, the device further includes:

a coordination module 1703, configured to perform coordinated scheduling on the terminal device according to the power usage state.

Optionally, the coordination module includes:

a first control unit, configured to control scheduling of the second network device for the terminal device according to the power usage state, where the second network device is a network device that controls the second cell; and/or a second control unit, configured to control scheduling of the first network device for the terminal device according to the power usage state.

Optionally, the first control unit is specifically configured to: calculate, according to the power usage state, a scheduling limitation under which the second network device can perform scheduling on the terminal device; and send control signaling to the second network device, where the control signaling includes the scheduling limitation.

Optionally, the first control unit is further specifically configured to determine scheduling of the first network device for the terminal device according to the power usage state and the scheduling limitation.

Optionally, the second control unit is specifically configured to determine scheduling of the first network device for the terminal device according to the power usage state.

Optionally, the device further includes:

a sending module 1704, configured to send notification signaling to the second network device, so that the second network device sends, to the first network device, the signaling that includes the power headroom PH of the second cell corresponding to the terminal device and the channel configuration information corresponding to the PH.

The network device of this embodiment may be used for the technical solution of Embodiment 5 of the power control method, an implementation principle and a technical effect of this embodiment are similar to those of Embodiment 5, and details are not described herein again.

Figure 18:
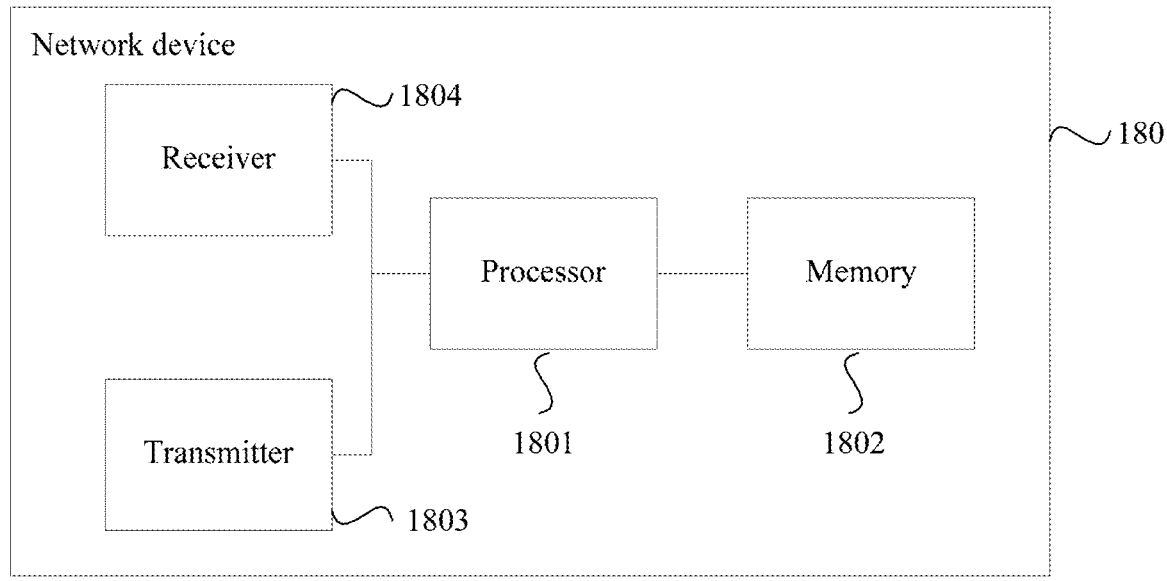
FIG. 18 is a schematic structural diagram of Embodiment 6 of a network device according to the present invention.

FIG. 18 is a schematic structural diagram of Embodiment 6 of a network device according to the present invention. As shown in FIG. 18, a network device 180 provided in this embodiment includes: a processor 1801 and a memory 1802. The network device 180 may further include a transmitter 1803 and a receiver 1804. The transmitter 1803 and the receiver 1804 may be connected to the processor 1801. The transmitter 1803 is configured to send data or information, the receiver 1804 is configured to receive data or information, and the memory 1802 is configured to store an execution instruction. When the network device 180 runs, the processor 1801 and the memory 1802 communicate with each other, and the processor 1801 invokes the execution instruction in the memory 1802 and is configured to perform operations in Embodiment 5 of the foregoing power control method.

The network device of this embodiment may be configured to perform the technical solution of Embodiment 5 of the power control method of the present invention, an implementation principle and a technical effect of this embodiment are similar to those of Embodiment 5, and details are not described herein again.

Figure 19:
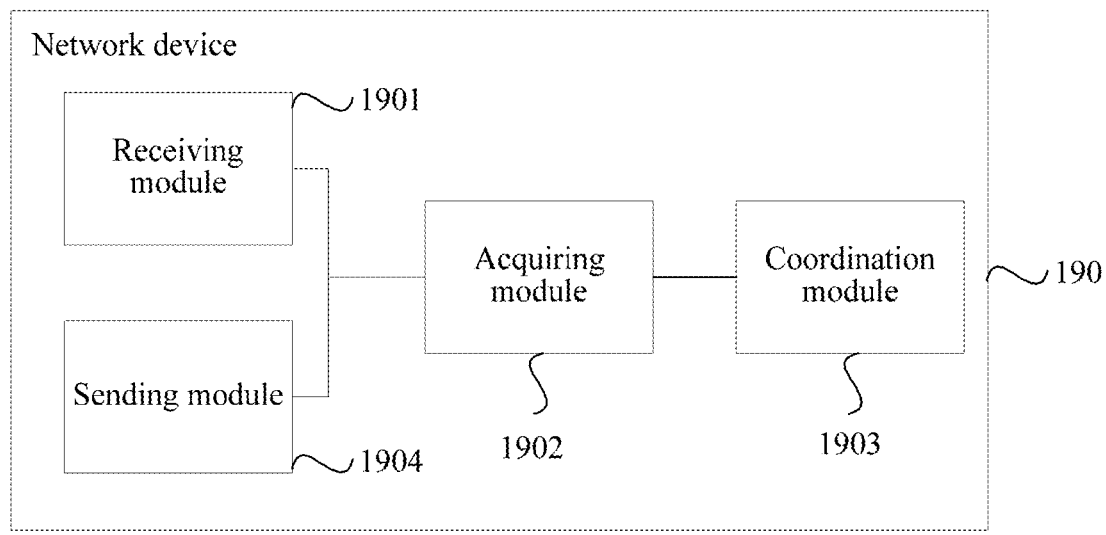
FIG. 19 is a schematic structural diagram of Embodiment 7 of a network device according to the present invention.

FIG. 19 is a schematic structural diagram of Embodiment 7 of a network device according to the present invention. As shown in FIG. 19, a network device 190 provided in this embodiment includes: a receiving module 1901 and an acquiring module 1902.

The receiving module 1901 is configured to: when channel transmission exists in a subframe of a second cell, wherein a power headroom PH corresponds to the subframe of the second cell, receive signaling sent by a second network device, where the second network device is a network device that controls the second cell; and the signaling includes the PH of the second cell corresponding to a terminal device and maximum transmit power corresponding to the PH; and the acquiring module 1902 is configured to acquire, according to the PH and the maximum transmit power, a power usage state of the second cell corresponding to the terminal device, where the PH is obtained through calculation by the terminal device based on pre-defined channel configuration information or based on channel configuration information configured by a signaling; and the maximum transmit power corresponding to the PH is maximum transmit power configured by the terminal device for the second cell in the subframe of the second cell corresponding to the PH.

Optionally, the channel includes at least one of the following channels: a physical uplink shared channel PUSCH and a physical uplink control channel PUCCH.

Optionally, the channel configuration information includes at least one piece of the following information: a quantity of resource blocks RBs, a scheduling grant manner, transmission format information, and channel sending state information.

Optionally, the scheduling grant manner includes at least one of the following manners:

a semi-persistent scheduling grant, a dynamic scheduling grant, and a random access response grant.

Optionally, the transmission format information includes at least one piece of the following information:

bits information of a PUSCH, whether a PUSCH carries only control information, a transmission format of a PUCCH, and bits information of PUCCH transmission.

Optionally, the device further includes:

a coordination module 1903, configured to perform coordinated scheduling on the terminal device according to the power usage state.

Optionally, the coordination module includes:

a first control unit, configured to control scheduling of the second network device for the terminal device according to the power usage state, where the second network device is a network device that controls the second cell; and/or a second control unit, configured to control scheduling of the first network device for the terminal device according to the power usage state.

Optionally, the first control unit is specifically configured to:

calculate, according to the power usage state, a scheduling limitation under which the second network device can perform scheduling on the terminal device; and send control signaling to the second network device, where the control signaling includes the scheduling limitation.

Optionally, the first control unit is further specifically configured to determine scheduling of the first network device for the terminal device according to the power usage state and the scheduling limitation.

Optionally, the second control unit is specifically configured to determine scheduling of the first network device for the terminal device according to the power usage state.

Optionally, the device further includes:

a sending module 1904, configured to send notification signaling to the second network device, so that the second network device sends, to the first network device, the signaling that includes the PH and the maximum transmit power corresponding to the PH.

The network device of this embodiment may be used for the technical solution of Embodiment 6 of the power control method, an implementation principle and a technical effect of this embodiment are similar to those of Embodiment 6, and details are not described herein again.

Figure 20:
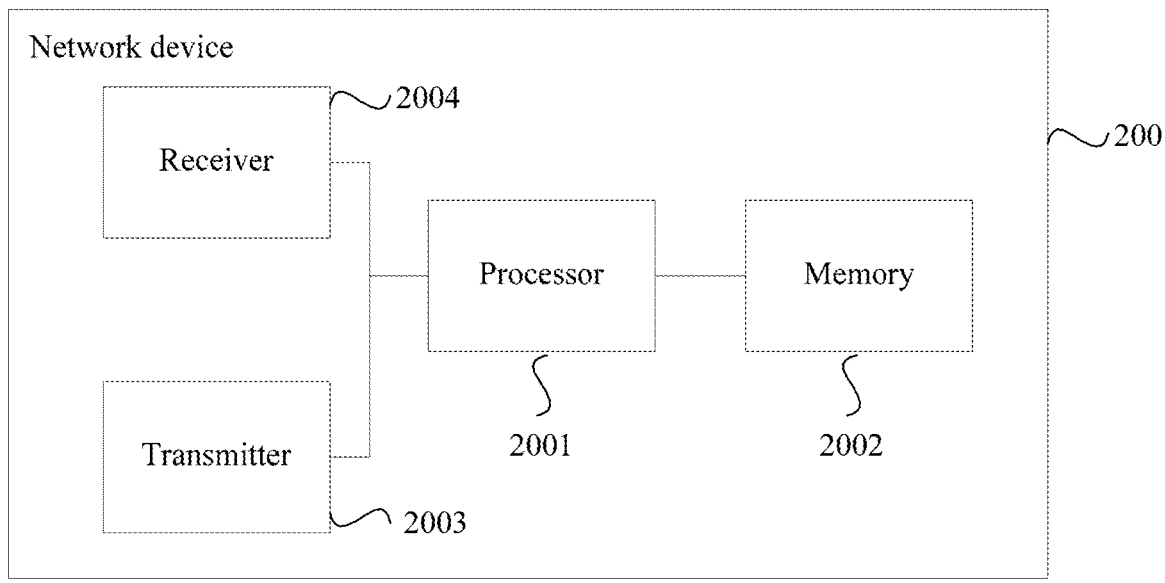
FIG. 20 is a schematic structural diagram of Embodiment 8 of a network device according to the present invention.

FIG. 20 is a schematic structural diagram of Embodiment 8 of a network device according to the present invention. As shown in FIG. 20, a network device 200 provided in this embodiment includes: a processor 2001 and a memory 2002. The network device 200 may further include a transmitter 2003 and a receiver 2004. The transmitter 2003 and the receiver 2004 may be connected to the processor 2001. The transmitter 2003 is configured to send data or information, the receiver 2004 is configured to receive data or information, and the memory 2002 is configured to store an execution instruction. When the network device 200 runs, the processor 2001 and the memory 2002 communicate with each other, and the processor 2001 invokes the execution instruction in the memory 2002 and is configured to perform operations in Embodiment 6 of the foregoing power control method.

The network device of this embodiment may be configured to perform the technical solution of Embodiment 6 of the power control method of the present invention, an implementation principle and a technical effect of this embodiment are similar to those of Embodiment 6, and details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof without departing from the scope of the technical solutions of the embodiments of the present invention.

What is claimed is:

1. A power usage state information transmission method comprising:
in response to a physical uplink shared channel (PUSCH) transmission being in a subframe of a second cell, determining, by a terminal device, based on channel configuration information configured by a signaling, a power headroom (PH) of the second cell associated with to the terminal device,
wherein the PH is associated with the subframe of the second cell and the PH is determined by the formula:

$$PH=\tilde{P}_{CMAX,c}(t)-\{P_{O\_PUSCH,c}(1)+\alpha_c(1)PL_c+f_c(t)\}[dB],$$

wherein c is the second cell, i is the index of a subframe of the second cell, $\tilde{P}_{CMAX,c}(i)$ is maximum transmit power of the UE on a parameter assumption in the subframe i of the second cell, $P_{O\_PUSCH,c}(1)$ is an open-loop power control adjustment value, $\alpha_c(1)$ is a partial path loss compensation value, $PL_c$ is a path loss of the second cell obtained through measurement by the terminal device, $f_c(i)$ is a closed-loop power control adjustment value;
sending, by the terminal device, the PH to a first network device, and skipping sending $\tilde{P}_{CMAX,c}(i)$ to the first network device, wherein the first network device is a network device that controls a first cell and the second cell is controlled by a second network device; and
receiving, by the terminal device, scheduling information from the first network device.

2. The method according to claim 1, wherein the channel configuration information includes channel sending state information, and wherein the channel sending state includes whether to send a PUSCH.

3. The method according to claim 1, wherein $P_{O\_PUSCH,c}(1)$ is an open-loop power control adjustment value when the PUSCH transmission is granted by means of dynamic scheduling.

4. The method according to claim 1, wherein before sending the PH to the first network device, the method further comprises:
receiving, by the terminal device, the signaling, wherein the signaling comprises the channel configuration information.

5. A power usage state information transmission method comprising:
in response to a physical uplink shared channel (PUSCH) transmission being in a subframe of a second cell, receiving from a terminal device, by a first network device, a power headroom (PH) of the second cell associated with the terminal device,
wherein the first network device is a network device that controls a first cell and the second cell is controlled by a second network device,
wherein the PH is associated with the subframe of the second cell and the PH is determined based on channel configuration information configured by a signaling, by the formula:

$$PH=\tilde{P}_{CMAX,c}(t)-\{P_{O\_PUSCH,c}(1)+\alpha_c(1)PL_c+f_c(t)\}[dB],$$

wherein c is the second cell, i is the index of a subframe of the second cell, $\tilde{P}_{CMAX,c}(i)$ is maximum transmit power of the UE on a parameter assumption in the subframe i of the second cell, $P_{O\_PUSCH,c}(1)$ is an open-loop power control adjustment value, $\alpha_c(1)$ is a partial path loss compensation value, $PL_c$ is a path loss of the second cell obtained through measurement by the terminal device, $f_c(i)$ is a closed-loop power control adjustment value; and
acquiring, by the first network device according to the PH, a power usage state of the second cell associated with the terminal device without receiving $\tilde{P}_{CMAX,c}(i)$ from the terminal device; and
sending, by the first network device, scheduling information to the UE.

6. The method according to claim 5, wherein the channel configuration information includes channel sending state information, and wherein the channel sending state includes whether to send a PUSCH.

7. The method according to claim 5, wherein $P_{O\_PUSCH,c}(1)$ is an open-loop power control adjustment value when the PUSCH transmission is granted by means of dynamic scheduling.

8. The method according to claim 5, wherein before receiving the PH of the second cell, further comprises:
sending, by the first network device, the signaling to the terminal device, wherein the signaling comprises the channel configuration information.

9. A terminal device comprising:
a processor configured to determine, based on channel configuration information configured by a signaling, a power headroom (PH) of a second cell associated with the terminal device in resposne to a physical uplink shared channel (PUSCH) transmission being in a subframe of the second cell,
wherein the PH is associated with the subframe of the second cell and the PH is determined by the formula:

$$PH=\tilde{P}_{CMAX,c}(t)-\{P_{O\_PUSCH,c}(1)+\alpha_c(1)PL_c+f_c(t)\}[dB],$$

wherein c is the second cell, i is the index of a subframe of the second cell, $\tilde{P}_{CMAX,c}(i)$ is maximum transmit power of the UE on a parameter assumption in the subframe i of the second cell, $P_{O\_PUSCH,c}(1)$ is an open-loop power control adjustment value, $\alpha_c(1)$ is a partial path loss compensation value, $PL_c$ is a path loss of the second cell obtained through measurement by the terminal device, $f_c(i)$ is a closed-loop power control adjustment value;

a transmitter configured to cooperate with the processor and send the PH to a first network device, and skip sending $\tilde{P}_{CMAX,c}(i)$ to the first network device, wherein the first network device controls a first cell and the second cell is controlled by a second network device; and a receiver configured to cooperate with the processor to receive scheduling information from the first network device.

10. The device according to claim 9, wherein the channel configuration information includes channel sending state information, and wherein the channel sending state includes whether to send a PUSCH.

11. The device according to claim 9, wherein $P_{O\_PUSCH,c}(1)$ is an open-loop power control adjustment value when the PUSCH transmission is granted by means of dynamic scheduling.

12. The device according to claim 9, further comprising:
the receiver configured to cooperate with the processor to receive the signaling, and wherein the signaling comprises the channel configuration information.

13. A network device comprising:
a processor;
a receiver configured to cooperate with the processor to receive a power headroom (PH) of a second cell corresponding to a terminal device from the terminal device in response to a physical uplink shared channel (PUSCH) transmission being in a subframe of the second cell,
wherein the first network device is a network device that controls a first cell, and
wherein the PH corresponds to the subframe of the second cell and the PH is determined based on channel configuration information configured by a signaling, by the formula:

$$PH=\tilde{P}_{CMAX,c}(t)-\{P_{O\_PUSCH,c}(1)+\alpha_c(1)PL_c+f_c(t)\}[dB],$$

wherein c is the second cell, i is the index of a subframe of the second cell, $\tilde{P}_{CMAX,c}(i)$ is maximum transmit power of the UE on a parameter assumption in the subframe i of the second cell, $P_{O\_PUSCH,c}(1)$ is an open-loop power control adjustment value, $\alpha_c(1)$ is a partial path loss compensation value, $PL_c$ is a path loss of the second cell obtained through measurement by the terminal device, $f_c(i)$ is a closed-loop power control adjustment value;

the processor configured to acquire, according to the PH, a power usage state of the second cell associated with the terminal device without receiving $\tilde{P}_{CMAX,c}(i)$ from the terminal device; and a transmitter configured to cooperate with the processor to send scheduling information to the UE.

14. The device according to claim 13, wherein the channel configuration information includes channel sending state information, and wherein the channel sending state includes whether to send a PUSCH.

15. The device according to claim 13, wherein $P_{O\_PUSCH,c}(1)$ is an open-loop power control adjustment value when the PUSCH transmission is granted by means of dynamic scheduling.

16. The device according to claim 13, further comprising:
the transmitter further configured to cooperate with the processor to send the signaling to the terminal device, wherein the signaling comprises the channel configuration information.

17. The method according to claim 1, wherein the parameter assumption includes:
maximum power reduction being 0 dB, additional maximum power reduction being 0 dB, and power management maximum power reduction being 0 dB, and TC=0 dB, wherein TC is a parameter related to a band edge transmit power limitation.

18. The method according to claim 5, wherein the parameter assumption includes:
maximum power reduction being 0 dB, additional maximum power reduction being 0 dB, and power management maximum power reduction being 0 dB, and TC=0 dB, wherein TC is a parameter related to a band edge transmit power limitation.

19. The device according to claim 9, wherein the parameter assumption includes:
maximum power reduction being 0 dB, additional maximum power reduction being 0 dB, and power management maximum power reduction being 0 dB, and TC=0 dB, wherein TC is a parameter related to a band edge transmit power limitation.

20. The device according to claim 13, wherein the parameter assumption includes:
maximum power reduction being 0 dB, additional maximum power reduction being 0 dB, and power management maximum power reduction being 0 dB, and TC=0 dB, wherein TC is a parameter related to a band edge transmit power limitation.

* * * * *

UNITED STATES PATENT AND TRADEMARK OFFICE
CERTIFICATE OF CORRECTION

PATENT NO. : 10,588,095 B2
APPLICATION NO. : 15/179731
DATED : March 10, 2020
INVENTOR(S) : He et al.

It is certified that error appears in the above-identified patent and that said Letters Patent is hereby corrected as shown below:

In the Claims

Claim 1: Column 51, Line 38:
"with to the terminal device,"
Should read:
-- with the terminal device --.

Claim 1: Column 51, Line 43: Equation:
"$PH = \tilde{P}_{CMAX,c}(t) - \{P_{O_{PUSCH},c}(1) + \alpha_c(1) PL_c + f_c(t)\}[dB]$,"
Should read:
-- $PH = \tilde{P}_{CMAX,c}(i) - \{P_{O_{PUSCH},c}(1) + \alpha_c(1) PL_c + f_c(i)\}[dB]$ --.

Claim 5: Column 52, Line 22: Equation:
"$PH = \tilde{P}_{CMAX,c}(t) - \{P_{O_{PUSCH},c}(1) + \alpha_c(1) PL_c + f_c(t)\}[dB]$,"
Should read:
-- $PH = \tilde{P}_{CMAX,c}(i) - \{P_{O_{PUSCH},c}(1) + \alpha_c(1) PL_c + f_c(i)\}[dB]$ --.

Claim 9: Column 52, Line 61: Equation:
"$PH = \tilde{P}_{CMAX,c}(t) - \{P_{O_{PUSCH},c}(1) + \alpha_c(1) PL_c + f_c(t)\}[dB]$,"
Should read:
-- $PH = \tilde{P}_{CMAX,c}(i) - \{P_{O_{PUSCH},c}(1) + \alpha_c(1) PL_c + f_c(i)\}[dB]$ --.

Claim 13: Column 53, Line 39: Equation:
"$PH = \tilde{P}_{CMAX,c}(t) - \{P_{O_{PUSCH},c}(1) + \alpha_c(1) PL_c + f_c(t)\}[dB]$,"
Should read:
-- $PH = \tilde{P}_{CMAX,c}(i) - \{P_{O_{PUSCH},c}(1) + \alpha_c(1) PL_c + f_c(i)\}[dB]$ --.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*